United States Patent [19]
Kashiwai et al.

[11] Patent Number: 5,386,440
[45] Date of Patent: Jan. 31, 1995

[54] BOILING WATER REACTOR

[75] Inventors: Shin-ichi Kashiwai, Hitachi; Osamu Yokomizo, Toukai; Akihito Orii, Hitachi; Koji Nishida, Hitachi; Toru Kanazawa, Hitachi; Kumiaki Moriya, Hitachi, all of Japan

[73] Assignee: Hitachi, Ltd., Tokyo, Japan

[21] Appl. No.: 675

[22] Filed: Jan. 5, 1993

[30] Foreign Application Priority Data

Jan. 10, 1992 [JP] Japan .................. 4-003013
Jun. 18, 1992 [JP] Japan .................. 4-159134

[51] Int. Cl.$^6$ .................................................. G21C 3/32
[52] U.S. Cl. ........................................ 376/210; 376/444
[58] Field of Search .............. 376/210, 352, 438, 443, 376/444

[56] References Cited

U.S. PATENT DOCUMENTS

| | | | |
|---|---|---|---|
| 4,686,079 | 8/1987 | Ishikawa et al. | 376/444 |
| 4,781,885 | 11/1988 | Lill et al. | 376/444 |
| 4,795,608 | 1/1989 | Nylund | 376/444 |
| 4,803,044 | 2/1989 | Patterson | 376/444 |

FOREIGN PATENT DOCUMENTS

| | | |
|---|---|---|
| 63-22518 | 2/1988 | Japan . |
| 63-73192 | 4/1988 | Japan . |
| 63-83691 | 4/1988 | Japan . |
| 63-26119 | 10/1988 | Japan . |

Primary Examiner—Donald P. Walsh
Assistant Examiner—Frederick H. Voss
Attorney, Agent, or Firm—Antonelli, Terry, Stout & Kraus

[57] ABSTRACT

An object of the present invention is to provide a boiling water reactor wherein two phase flow instability in a fuel assembly occurs scarcely.

A bottom flow path is formed beneath a partition plate which is supported by control rod driving mechanism housings in a reactor pressure vessel, and coolant guide tubes which open beneath the partition plate stands perpendicularly on the partition plate. An upper end portion of the coolant guide tube is restrained at outer periphery by a fixing portion of a square grid, and a coolant entrance of a fuel assembly is connected through to the coolant guide tube.

Pressure loss of the coolant decreases and flow instability of the coolant in the fuel assembly occurs scarcely, lowering of a critical power ratio at a pump trip can be suppressed.

25 Claims, 18 Drawing Sheets

BOILING WATER REACTOR

BACKGROUND OF THE INVENTION (1) Field of the Invention

The present invention relates to boiling water reactors. The present invention includes a preferable reactor core lower structure for applying fuel assemblies of which four sides are surrounded with nuclear reactor control rods (hereinafter simply called control rods) blades into the reactor core.

(2) Description of the Prior Art

A schematic vertical cross section of a conventional boiling water reactor is indicated in FIG. 3. In the boiling water reactor, a region being surrounded with the shroud 2 in the nuclear reactor pressure vessel 1 and existing between the upper grid 4 and the lower grid 5, wherein a plurality of the fuel assemblies 3 are installed is called the reactor core 6. A portion lower than the lower grid 5 is called the lower plenum 7, wherein the control rod driving mechanism housing 8 and the control rod guide tubes 9 which attached to the control rod driving mechanism housing 8 are installed through a lower end plate of the nuclear reactor pressure vessel 1. A coolant existing in the circular flow path 10 between an internal wall of the nuclear reactor pressure vessel 1 and the shroud 2 is pressurized and sent into the lower plenum 7 by the internal pumps 11, and subsequently the coolant is sent into the fuel assemblies 3.

A structure which is installed in the lower plenum 7 is explained according to FIG. 4. The control rod guide tubes 9 are inserted by the control rod driving mechanism housing 8 which are welded to the lower end plate of the nuclear reactor pressure vessel 1, and stand perpendicularly. Furthermore, the fuel support piece 12 which can support four fuel assemblies 3 is inserted into the top portion of the control rod guide tubes 9. That means, a total weight of the four fuel assemblies 3 is supported by the lower end plate of the nuclear reactor pressure vessel 1 via the fuel support piece 12, the control rod guide tube 9, and the control rod driving mechanism housing 8. The lower grid 5 prevents the top portion of the control rod guide tube 9 from horizontal vibration.

The coolant supplied into the lower plenum 7 by the internal pumps 11 ascends along outer side wall of the control rod guide tubes 9, enters into the fuel support piece 12 through holes which are provided on the side wall near a top end of the control rod guide tube 9, and guided into the fuel assemblies 3. The coolant is not supplied so much into the control rod guide tubes 9, because heat generation of the control rods 13 (FIG. 4 indicates the control rods 13 under withdrawn condition) is small. That means, the control rod guide tube 9 has a role to limit the coolant flow paths. And, The entrance orifice 18 is provided at an entrance of the fuel support piece 12 in order to stabilize coolant distribution for each fuel assembly 3. Thus, the coolant flow ascends along outer side wall of the control rod guide tube 9, enters into the fuel support piece 12 by changing flow direction in 90 degrees, and by straining through the entrance orifice 18 alters to ascending flow again in the fuel support piece 12. The ascending flow is such a complex flow that it flows in a flow path expanding one-sided, and accordingly, pressure loss of the flow is large.

If a pressure loss in the fuel assembly 3 is remarkably larger than that of the flow before the entrance of the fuel assembly 3, a stability in two phase flow in the fuel assembly 3 is lost. Therefore, a large pressure loss by the fuel support piece 12 contributes to maintain the stability of the two phase flow in the fuel assembly 3, but a large delivery pressure is required for the internal pump 11.

The amount of the coolant supplied to the reactor core can be calculated by total summation of coolant flows of the internal pumps 11 which are obtained by calculation of the coolant flow for each pump based on pressure difference before and after the pump. Accordingly, an amount of coolant flow which enters into each fuel assembly 3 can not be confirmed.

Furthermore, when the internal pump 11 causes a trip, a margin in a critical power ratio (hereinafter indicates as a CPR, a larger CPR means larger safety), which is a ratio of an output power (critical power) at which nucleate boiling in the reactor core alters to film boiling to an operation power, becomes temporarily small because decrease in heat flux is slower in comparison with decrease in coolant flow in the reactor core.

In the control rod guide tube 9, the control rod 13 having cruciform blades is so provided as to move vertically. A partial cross sectional view of the control rod guide tube 13 downwards from top of the tube is illustrated in FIG. 5 which is a vertical cross section taken on line A—A in FIG. 4. In the FIG.5, it is indicated that the control rod 3 penetrates an approximately cruciform space which is formed by surrounding four flow paths 16 of the fuel support piece 12 guiding the coolant into the fuel assembly 3.

The velocity limiter 14 which has an umbrella shape as shown in FIG. 4 is provided at the lower end portion of the control rod 13. When the control rod 13 falls down (withdraw) fast from an insertion position, a large reactivity is supplied to the reactor core. The velocity limiter 14 is aimed at restricting falling speed of the control rod 13. That is, the falling of the control rod 13 is caused when the control rod 13 in the inserting condition is altered to the withdrawing condition, the coupling 15 for connecting the control rod 13 and the control rod driving rod 17 is detached by catching of the control rod 13 and only the control rod driving rod 17 alters to the withdrawing condition, and then the catching condition of the control rod 13 is canceled by any unknown reason. When the control rod 13 falls, water existing under the velocity limiter 14 moves from a small space between the control rod guide tube 9 and the velocity limiter 14 to a space on the velocity limiter 14, and flow resistance of the water moving restricts falling speed of the control rod 13.

Neutron absorbing capacity of the control rod 13 decreases depending on time elapsing, and the control rod 13 is exchanged after the absorbing capacity reaches to a predetermined value. An order of the control rod exchange procedure is explained hereinafter.

First, the four fuel assemblies 3 mounted on the guide tube 9 of the control rod 13 to be exchanged are hung up and removed, and subsequently the fuel support piece 12 is hung up and removed. Then, a space for hanging up the velocity limiter 14 is formed. The coupling 15 for connecting the control rod 13 and the control rod driving rod 17 is detached, and the control rod 13 is hung up and removed.

After exchange of the control rod 13 is finished, the fuel support piece 12 and the fuel assemblies 3 are piled up on the control rod guide tube 9 in the above describing order so as to return to the original condition.

A partial plan view of a conventional reactor core 6 is schematically indicated in FIG. 6, wherein one control rod 13 locates at the center and four fuel assemblies 3 are arranged around the control rod as previously described.

Accordingly, two sides of the fuel assembly 3 contact with the control rod 13. Besides, the dotted line in FIG. 6 indicates outer diameter of the control rod guide tube 9.

As previously described, it is desirable to make the pressure loss at the entrance portion of the fuel assembly small in view of pump operating power, but stability of the two phases flow in the fuel assembly must be maintained. Furthermore, it is desirable to prevent the temporary lowering of the CRP at the pump trip occurrence, and to achieve high burn up in order to improve fuel economy.

In order to improve fuel economy by achieving high burn up, a method wherein sizes of the fuel assembly and the control rod are made larger than before so as to optimize the ratio of water to uranium has been proposed as disclosed in JP-A-63-73192 (1988) and JP-A-63-261192 (1988). A partial plan view of the proposed reactor core is schematically illustrated in FIG. 7, wherein the control rods are so arranged as to contact with four sides of the large sized fuel assembly 3. However, if the above described arrangement of the fuel assembly 3 and the control rods 13 is applied to the lower structure of the conventional reactor core, adjacent control rod guide tubes 9 shown by dashed lines in FIG. 7 collide each other.

In order to solve the above described problem, structures comprising control rod guide tubes having a cruciform shape or a similar shape with the cruciform and fuel support pieces for two fuel assemblies are proposed in JP-A-63-83691 (1988) and JP-A-63-225189 (1988).

The cruciform control rod guide tube disclosed in JP-A-63-83691 (1988) makes it possible to avoid a mutual interference of the above described control rod guide tubes, but manufacturing of the tube is not simple. Especially, the control rod guide tube is required to have a necessary and an enough strength for supporting a plurality of fuel assemblies, and the cruciform control rod guide tube seems to be unreliable in view of mechanical strength. Further, the cruciform control rod guide tube has many bending portions which have small diameters for bending, and it is necessary to consider release of residual stress caused by manufacturing. Furthermore, a small gap must be retained along an inner side wall of the control rod guide tube for a long axial distance. If a portion covering the blades deforms inward at an intermediate portion of the total axial length, there will be a possibility that the portion causes friction with the blades.

The control rod guide tube having an almost similar shape with cruciform shape which is disclosed in JP-A-63-225189 (1988) has wider diameter and less thin portions than those of the cruciform control rod guide tube, and accordingly, a mechanical strength and avoidance of the mutual interference of the adjacent control rods guide tubes can be compatible. However, as the diameter of the control rod guide tube becomes wide, the coolant entrance portion of the fuel support piece which must be mounted on the control rod guide tube is arranged at inside of the control rod guide tube, and accordingly, the coolant is supplied to the fuel assembly through such a complex flow path that holes are provided in side walls at the upper end portion of the control rod guide tube, the coolant enters from side of the control rod guide tube, and the coolant flow is altered to an ascending flow. Consequently, the pressure loss of the coolant flow becomes large easily.

Main roles assigned to the lower structure of the reactor core are transferring whole weight of the fuel assemblies to the nuclear reactor pressure vessel and separating the coolant main flow which led to the fuel assemblies from the control rods. In view of pump operating power, the lower structure of the reactor core having a small pressure loss of the coolant to the fuel assemblies is desirable. The pressure loss relates to maintaining of two phase flow stability in the fuel assembly, and to temporary lowering of the critical power ratio (CPR) accompanied with flow decreasing at pump tripping. On the other hand, the reactor core having an arrangement wherein the control rods locate at four sides of the fuel assembly had disadvantages in a mechanical strength for supporting the fuel assemblies and in a pressure loss, although it had an advantage in improvement of fuel economy by high burn up of the fuel.

SUMMARY OF THE INVENTION (1) Objects of the Invention:

The first object of the present invention is to provide a boiling water reactor wherein instability of two phases flow in the fuel assembly scarcely occurs and lowering of the critical power ratio at a pump trip occurrence is suppressed.

The second object of the present invention is to provide a boiling water reactor which does not have disadvantages in mechanical strength for supporting the fuel assemblies and in pressure loss.

One of the other objects is to provide members for applying to the above mentioned boiling water reactors.

(2) Methods Solving the Problems:

The first means for achieving the first object of the present invention is a boiling water reactor, wherein a coolant is supplied to fuel assemblies in the nuclear reactor pressure vessel through a lower plenum which locates beneath the fuel assemblies, characterized in that guide tubes for the coolant to the fuel assemblies are extended to the close vicinity of upper ends of control rod driving mechanism housings in the lower plenum of the nuclear reactor pressure vessel.

The second means is a boiling water reactor according to the above first means characterized in that the fuel assemblies are supported by the coolant guide tubes, the coolant guide tubes are supported by partition plates which divide the lower plenum in two parts, an upper portion and a lower portion, the partition plates are supported by the nuclear reactor pressure vessel, and a coolant entrance of the coolant guide tube opens at a lower region than the partition plates.

The third means is a boiling water reactor according to the above first means characterized in that the fuel assemblies are supported by the coolant guide tubes and supporting members which are installed in the lower plenum, the supporting members are supported by partition plates which divide the lower plenum in two parts, an upper portion and a lower portion, the partition plates are supported by the nuclear reactor pressure vessel, and a coolant entrance of the coolant guide tube opens at a lower region than the partition plates.

The fourth means is a boiling water reactor according to the above second means characterized in that the coolant guide tubes are connected at the grid portion which is so arranged as not to interfere with vertical motion ranges of the control rods in a horizontal direction between intervals of a plurality of fitting portions to which the upper portion of the coolant guide tubes are fitted in.

The fifth means is a boiling water reactor according to any of the above second or third means characterized in that the fuel assemblies are so connected with the coolant guide tubes as to make the coolant flow via fuel support pieces, the fuel support piece is furnished with a brim which is horizontally widened, a periphery of the grid plate partly faces with an adjacent grid plates in a horizontal direction, and a moving space for the control rod is formed at other portions of the grid plate periphery.

The sixth means is a boiling water reactor according to any of the above second or third means characterized in that grid plates which are mutually divided and are furnished with through holes for the control rods moving are provided at horizontal intervals among the adjacent coolant guide tubes, and the adjacent grid plates are so arranged that periphery portions of the grid plates face mutually in a horizontal direction.

The seventh means is a boiling water reactor according to the above first means characterized in that the coolant guide tubes are installed vertically along almost full length of the control rod guide tubes which are installed in the lower plenum, and the coolant entrances of the coolant guide tubes are so connected to the outside of the control rod guide tubes as to make the coolant flow.

The eighth means is a boiling water reactor according to the above seventh means characterized in that the coolant guide tubes are installed in the control rod guide tube region which is partitioned with blades of the control rods which are guided by the control rods guide tubes.

The ninth means is a boiling water reactor according to the above eighth means characterized in that the coolant exit of the coolant guide tube is connected via a sealing means to the coolant entrance of the fuel support piece which is supported by the control rod guide tubes, the entrance of the coolant guide tube opens at outside of the control rod guide tube, and a plurality of the coolant guide tubes and the coolant entrance of the fuel support pieces in a same number are provided to the each control rod guide tube in a same number.

The tenth means is a boiling water reactor according to any of the above second or fourth means characterized in that the coolant guide tube is provided to each fuel assembly, and the coolant outlet of the coolant guide tube is connected directly to the coolant entrance of the fuel assembly.

The eleventh means is a boiling water reactor according to any of the above first to tenth means characterized in that the coolant guide tube is provided to each fuel assembly, and a flow rate measuring means is provided to the coolant guide tube.

The twelfth means is a boiling water reactor wherein a coolant is supplied to fuel assemblies in the reactor core from a lower plenum existing beneath the fuel assemblies characterized in being provided with coolant guide tubes, of which value of a flow path length divided by a cross sectional area of the flow path is at least 400, for the fuel assemblies in the lower plenum.

The thirteenth means for achieving the second object is a boiling water reactor characterized in that a fuel support piece is provided per a fuel assembly, the fuel support piece is provided with a downcast coolant entrance, furthermore, the fuel support piece is so supported by a plurality of mutually adjacent control rod guide tubes that the coolant entrance locates at upper portion than a region among a plurality of the mutually adjacent control rod guide tubes, and the region, the coolant entrance, and the fuel assembly are arranged on a substantially straight line.

The fourteenth means is a boiling water reactor according to the above thirteenth means characterized in that the fuel support piece has grid plates for covering horizontal interval regions among the adjacent control rods and hook portions for hooking horizontally with the control rod guide tubes adjacent to the fuel support piece, the grid plate has such a shape that at least a part of the grid plate contacts horizontally with other adjacent grid plate, and the control rod guide tube is so bent as to widen a lower region of the coolant entrance of the fuel support piece.

The fifteenth means for achieving the other object is a fuel support piece comprising a coolant outlet which connects with a coolant entrance of a fuel assembly at the upper portion and a coolant entrance which opens in a vertical direction beneath the coolant outlet characterized in being provided with a grid plate spreading horizontally from outer side wall of the fuel support piece.

The sixteenth means is a fuel support piece characterized in being furnished with a labyrinth at internal periphery of the coolant entrance of the fuel support piece.

The seventeenth means is a fuel support piece characterized in being furnished with a horizontal brim projecting outward from outside wall of the fuel support piece for placing the fuel support piece onto the grid plate.

The eighteenth means is a divided grid plate which is divided into polygonal shapes characterized in that a through hole for control rod moving is provided at an inner portion of each side of the polygonal shape, and a notch for fixing with a member for supporting the grid plate is provided at a portion of the side of the polygonal shape.

The nineteenth means is a grid plate characterized in that a fitting portion wherein a member for supporting vertical weight of the fuel assembly can be fitted is provided at middle of four sides of a square grid frame.

The twentieth means is a coolant guide tube for fuel assembly comprising a tube being provided with a hole for connecting with a coolant entrance of the fuel support piece at upper end portion and a reactor coolant entrance at lower end portion, of which axial length is substantially equivalent to a whole length from coolant entrance of the fuel support piece to the vicinity of an upper end portion of a control rod driving mechanism housing.

The twenty-first means is a coolant guide tube for fuel assembly having at least a value of 400 for a value of flow path length divided by cross sectional area of the flow path.

The twenty-second means is a control rod guide tube wherein a plurality of coolant guide tubes which connect to coolant entrance of the fuel support piece are provided so as to avoid interfering vertical movement of the control rod, and a coolant entrance of the coolant guide tube connects to outside of the tube so as to make the coolant flow at the vicinity of lower portion of the tube.

In accordance with the first means, the coolant in the lower plenum is supplied to the fuel assembly through inside of the coolant guide tube. As an inertia of the coolant flow in the coolant guide tube increases in proportion to L/A (Length/Flow path area) of the coolant guide tube, an effect on increasing inertia is obtained by extending the length of the guide tube, L, to the vicinity of the upper end portion of the control rod driving mechanism housing 8. Depending on the effect, a decay ratio of fluid vibration of the coolant flow (a value of a height of a wave in a vibration wave of the flow divided by a height of the previous wave) becomes small and flow stability is improved.

In accordance with the second means, an effect to support the fuel assembly is obtained in addition to the effect by the first means.

In accordance with the third means, the fuel assembly is supported by the supporting member and the coolant guide tube becomes irrelevant to the supporting function. Therefore, such an effect that arbitrary selection of design condition such as L/A (Length/Flow path area) of the coolant guide tube becomes possible in addition to the effect by the first means.

In accordance with the fourth means, an effect to support the fuel assembly tightly without disturbing movement of the control rod can be obtained in addition to the effect by the second means because the coolant guide tube is supported horizontally by the grid which does not disturb the vertical movement of the control rod.

In accordance with the fifth means, effects that a horizontal position of the coolant guide tube connected with the fuel support piece is maintained and that the control rod is able to move vertically through a space for moving formed at the brim portion can be obtained in addition to the effects by the second or the third means because the coolant is supplied to the fuel assembly through the fuel support piece, a horizontal position of the fuel support piece is maintained by horizontally contacting the brim of the fuel support piece with the brim of the adjacent fuel support piece.

In accordance with the sixth means, an effect that horizontal locations of the coolant guide tubes are maintained at exactly designated positions without drifting of the grid plates can be obtained in addition to the effects by the second or the third means because the grid plates hold the horizontal intervals of the coolant guide tubes by horizontal contacts of the grid plates mutually, and consequently, the control rods can move vertically through holes for moving which are formed in the grid plates.

In accordance with the seventh means, the coolant guide tube is extended approximately equivalent to the full length of the control rod guide tube and fixed, the coolant existing outside of the control rod guide tube can be supplied to inside of the fuel assembly with giving a large inertia through the coolant guide tube, and consequently, a fluid stability of the coolant is improved in addition to the effect by the first means.

In accordance with the eighth means, the coolant guide tube can allow vertical movement of the control rod in the control rod guide tube in spite of having such a compact composition as containing the coolant guide tube inside of the control rod guide tube in addition to the effect by the seventh means.

In accordance with the ninth means, an effect that a coolant flow having a preferable fluid stability can be supplied certainly to each coolant entrance of the fuel support piece in addition to the effect by the eighth means, because each of the coolant guide tube corresponds to each coolant entrance of the fuel support piece as a coolant supply flow path to the fuel assembly and also leakage is suppressed by a seal at the coolant entrance.

In accordance with the tenth means, in addition to the effects by the second or the fourth means, the fuel assemblies can be supported without existence of the fuel support piece, and consequently, pressure loss of the coolant can be reduced as much as lack of the fuel support piece and the fluid stability of the coolant can be improved.

In accordance with the eleventh means, an effect that a supplying flow rate of the coolant to each fuel assembly can be measured is obtained in addition to the effects by any of the means from the first to tenth.

In accordance with the twelfth means, when a coolant supply flow path of the coolant guide tube for the fuel assembly has a value of at least 400, which is obtained by dividing the length of the flow path with an area of the flow path, the decay ratio of the fluid vibration decreases by more than 10% in comparison with the fluid vibration of the coolant guide tube which is not extended into the lower plenum, and an effect for stabilizing the fluid becomes distinguished.

In accordance with the thirteenth means, the fuel support piece is supported by a plurality of the control rod guide tubes, and consequently, the coolant entrance of the fuel support piece can be installed in a downcast manner at outside region of the control rod guide tube although the control rod guide tube has a large diameter. The coolant ascends along the outside of the control rod guide tube, enters into the fuel support piece as an ascending flow, enters into the fuel assembly, and accordingly, an effect of reducing pressure loss can be obtained.

In accordance with the fourteenth means, mutual interferences of the control rod guide tubes can be avoided by using the widened region where the control rod guide tubes are bent inward in spite of a compact installation of the control rod guide tubes, furthermore, the coolant entrance of the fuel support piece can be directly inserted downward into the lower plenum by using the widened region, and accordingly, an effect that the coolant in the lower plenum can be supplied into the fuel assembly through the fuel support piece as an ascending flow. Additionally, the fuel support piece horizontally connects with the control rod guide tube at the fixing portion, and the grid plates of the fuel support piece horizontally contact mutually, and accordingly, an effect that the horizontal position of the fuel support piece can be certainly maintained is obtained.

In accordance with the fifteenth means, an effect that the grid plate interrupts the coolant flow to ascend along outside wall of the fuel support piece and leads the coolant flow from the coolant entrance of the fuel support piece to the outlet can be obtained.

In accordance with the sixteenth means, when the coolant guide tube is used by connecting to the coolant entrance of the fuel support piece, an effect that the labyrinth can prevent the connecting portion from leakage of the coolant is obtained.

In accordance with the seventeenth means, an effect that the horizontal brim projecting outward from the fuel support piece can press down the grid plate which interrupts the ascending coolant flow from the lower plenum at an original position is obtained, and the brim has an effect to keep stably the fuel support piece stand vertically.

In accordance with the eighteenth means, the grid plate allows a vertical motion of the control rod through a hole for moving, the grid plate is sustained by fixing with a supporting member at the notch portion, and an effect that an exchanging operation of the control rods can be performed with a partial removal of the grid plate because the grid plate is dividable into pieces.

In accordance with the nineteenth means, the horizontal intervals of the square grid frame are maintained as the horizontal intervals of the supporting members by fixing the supporting members into the fixing portion, and an effect to make the control rod move through a grid space of the square grid frame is obtained.

In accordance with the twentieth means, the coolant flow path can be restricted narrow by the coolant guide tube which is connected to the fuel support piece, and accordingly, a large inertia can be added to the coolant flow into the fuel support piece.

In accordance with the twenty-first means, the decay ratio of the coolant flow vibration becomes small, and accordingly, an effect to improve the fluid stability of the coolant flow into the fuel assembly can be obtained.

In accordance with the twenty-second means, the coolant guide tube has an approximately equivalent length to the control rod guide tube, and accordingly, the coolant guide tube can add a large inertia to the coolant flow from the lower plenum to the fuel support piece, furthermore, an effect that the control rod can move vertically without being interfered with the coolant guide tube is obtained.

DETAILED DESCRIPTION OF THE EMBODIMENTS (Embodiment 1)

Figure 3:
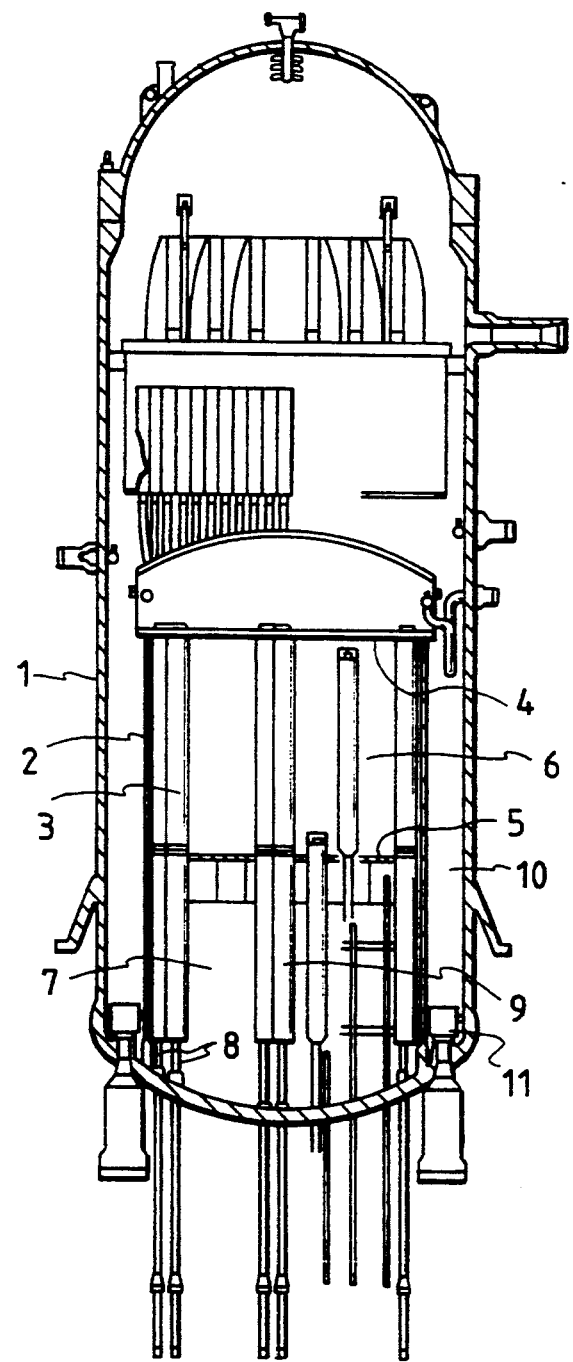
FIG. 3 is a schematic vertical cross section of a conventional boiling water reactor.

The first embodiment is explained with FIGS. 8, 9, 10, and 11. The first embodiment is an application of the present invention to the boiling water reactor shown in FIG. 3, and only a part of composition which have been changed by the application of the present invention are explained and rest of the composition are left unchanged.

Figure 8:
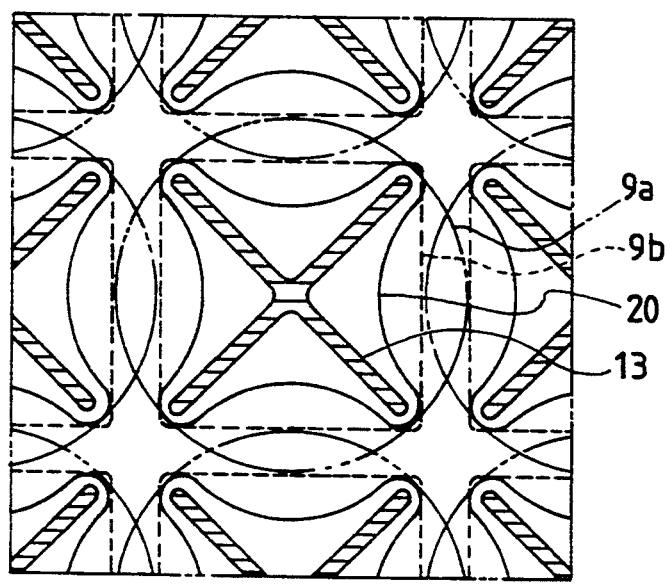
FIG. 8 is a horizontal cross section of the control rods and the control rod guide tubes both of which are adopted in the first embodiment.

FIG. 8 is a drawing for explanation on a conceptual cross sectional shape of the control rod guide tube for guiding vertical movement of the control rod 13 having a cruciform horizontal cross section. In a reactor core arrangement wherein the control rods are so arranged as to contact with the fuel assemblies at four sides of each fuel assemblies, if the same tubular control rod guide tube 9a as the conventional control rod guide tube is selected as for the control rod guide tube, the control rod guide tube mutually interferes with adjacent control rod guide tubes as shown by two dot chain lines in FIG. 8. Therefore, if the control rod guide tube 9b having a square cross section is selected as for the control rod guide tube, the mutual interference between adjacent control rod guide tubes can be avoided. But, although the coolant flows in an interval between the control rod guide tubes, adoption of the square shaped control rod guide tube 9b brings a small path area for the coolant flow. In the first embodiment, the control rod guide tube 20 having such an approximately square cross section as the square shape control rod guide tube 9b of which four sides are slightly bent inward as indicated by solid lines in FIG. 8 in order to widen the coolant flow path area without changing a pitch of the fuel assemblies (a pitch of the control rods) is adopted.

Figure 9:
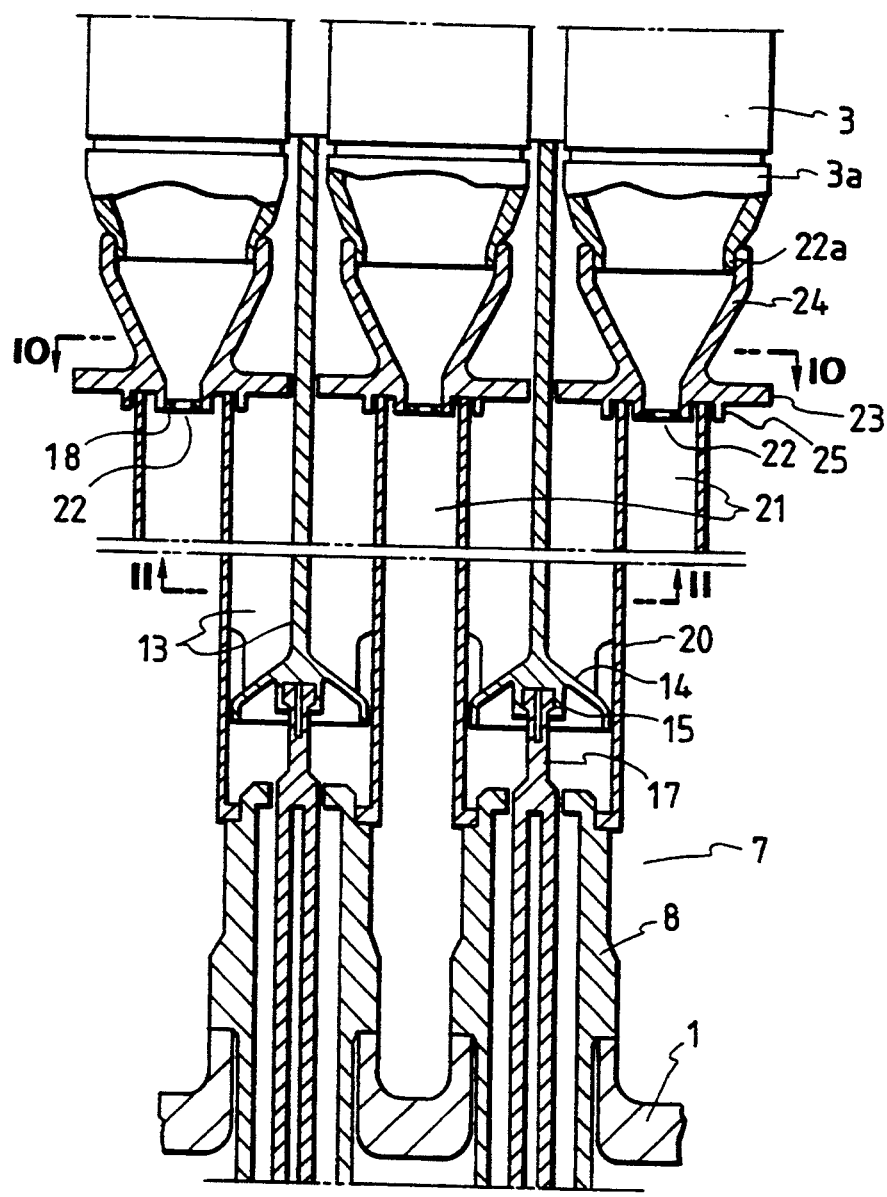
FIG. 9 is a partial vertical cross section of the reactor core lower structure of a boiling water reactor according to the first embodiment.
Figure 10:
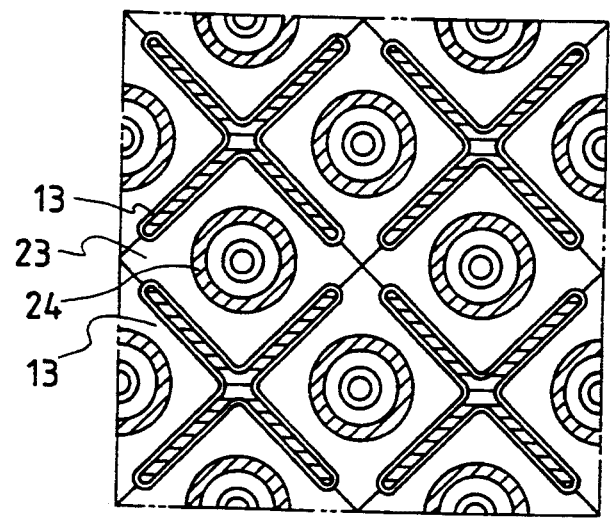
FIG. 10 is a cross section taken on line A—A of FIG. 9.
Figure 11:
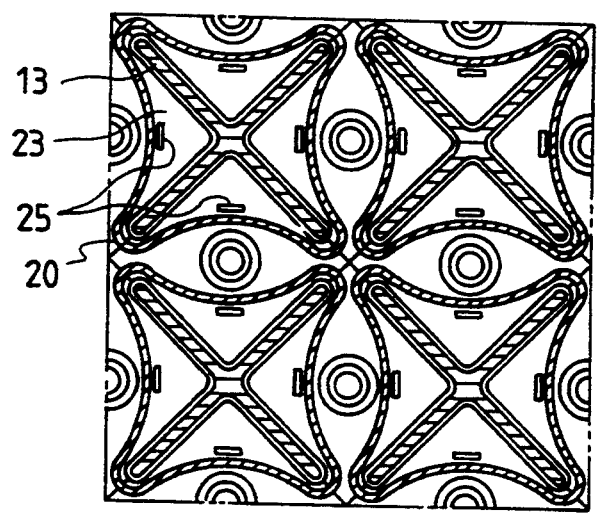
FIG. 11 is a cross section taken on line B—B of FIG. 9.

FIG. 9 is a partial vertical cross section of the reactor core lower structure and fuel assemblies of a boiling water reactor, FIG. 10 is a cross section taken on line A—A of FIG. 9, and FIG. 11 is a cross section taken on line B—B of FIG. 9. As same as a conventional reactor, a plurality of control rod driving mechanism housings 8 penetrate a bottom plate of the reactor pressure vessel 1 and are fixed thereto by welding.

The above described control rod guide tube 20 having the approximately square cross section is fixed to the top of the each control rod driving mechanism housing 8, stand vertically, and make the control rod driving mechanism housing 8 support the control rod guide tube 20. In the manner above described, the control rod driving mechanism housing 8 and the control rod guide tube 20 are installed in the lower plenum 7 of the reactor pressure vessel 1.

The fuel support piece 24 is arranged in a position which is centered at exactly above the center of the coolant flow path 21 formed between two adjacent control rod guide tubes 20 in a manner that the coolant entrance 22 opens in a downcast manner.

The fuel support piece 24 is furnished with a grid plate 23 at outer periphery for closing an upper end of the flow path 21 existing at outer periphery of the coolant entrance 22. The fuel support piece 24 is provided to each fuel assembly 3, and the fuel assembly is mounted on the fuel support piece so that the coolant entrance 3a of the fuel assembly 3 can be connected through to the coolant outlet 22a of the fuel support piece 24.

The fuel support piece 24 is placed on the two adjacent control rod guide tubes for being supported vertical weight. The grid plate 23 has two downcast projections at bottom outside, and the projection 25 contacts and fixes with inside of the control rod guide tube 20 so as to restrain relative movement with the control rod guide tube 20 in a horizontal direction.

The fuel assembly 3 is loaded on each of the fuel support piece 24. Accordingly, the control rod guide tube 20 supports a whole weight of two fuel assemblies 3 because each one side of the adjacent two control rod guide tubes 20 supports a half weight of the fuel assembly 3. The load supported by the control rod guide tube 20 is transferred to the bottom plate of the reactor pressure vessel 1 via the control rod driving mechanism housing 8 and is supported there.

The coolant supplied to the lower plenum 7 by internal pumps (not shown in the figure) ascends in a flow path 21 along outside wall of the control rod guide tube 20, and enters into the fuel assembly 3 from the coolant entrance 22 of the fuel support piece 24 as an ascending flow without changing its flowing direction. Accordingly, a pressure loss at the entrance portion of the fuel assembly 3 decreases because the flow path in the present invention is not so complex as the flow path of the conventional fuel support piece. The entrance orifice 18 for flow control can be installed at the coolant entrance 22 of the fuel support piece 24.

FIG. 10 indicates an overhead view of a horizontal cross section of the grid plate 23. The grid plate 23 having a horizontal spread incorporated with the fuel support piece 24 is formed in an approximately square shape which has slits to allow wing portions of the control rod 13 move vertically through at each of four sides as for vertical moving paths of the control rod. Two corners of the grid plate 23 which do not have the slits for the vertical moving paths of the control rod contact mutually with adjacent four grid plates 23 so as to restrain mutual horizontal displacements. The grid plate at the outermost periphery of the reactor core is supported horizontally by the shrouds in the reactor pressure vessel. And, the grid plate 23 closes the opening at the upper end portion of the control rod guide tube 20 except the moving paths for the control rod 13.

FIG. 11 indicates an upward view of a horizontal cross section from beneath the grid plate 23, and reveals that the spread 25 of the grid plate 23 are fixed to inner walls of four sides of the control rod guide tube 20 so as to restrain horizontal movement of the control rod guide tube 20. Accordingly, conventional lower grids become unnecessary.

At the lower end portion of the control rod 13, the velocity limiter 14 having a reversely tapered cross section is installed. A curvature of the moderate bending of each side of the control rod guide tube 20 which is shown in FIG. 8 is so determined that a space for vertical moving of the velocity limiter 14 is formed in the control rod guide tube 20.

An exchanging operation of the control rod 13 is performed in the order of the steps that the four fuel assemblies 3 surrounding the objective control rod 13 for the exchange and the fuel support piece 24 are removed, the coupling 15 of the control rod driving rod 17 and the control rod 13 is separated, the objective control rod is removed upward from the reactor core, a new control rod is inserted into the reactor core, and re-assembling can be performed by reverse steps of the above disassembling operation.

In accordance with the present embodiment, the control rod 13 can be used at a position adjacent to the four sides of the fuel assembly 3 in the reactor core, the control rod guide tube having an approximately square shape cross section has a simple shape and needs less bending work in comparison with conventional cruciform control rod guide tubes, and accordingly, the control rod guide tube of the present invention can be fabricated easily, and has a small residual stress and a preferable strength. The structure of the fuel support piece becomes simple and small in comparison with conventional pieces, and accordingly, fabrication of the fuel support piece becomes easy and an amount of radioactive wastes becomes small. The coolant flow path becomes simple in comparison with that of conventional reactors, and the pressure loss becomes small.

Furthermore, the exchanging operation of the control rod can be performed by removing four fuel assemblies surrounding the objective control rod and fuel support pieces as same as that of the conventional reactors.

(Embodiment 2)

Figure 7:
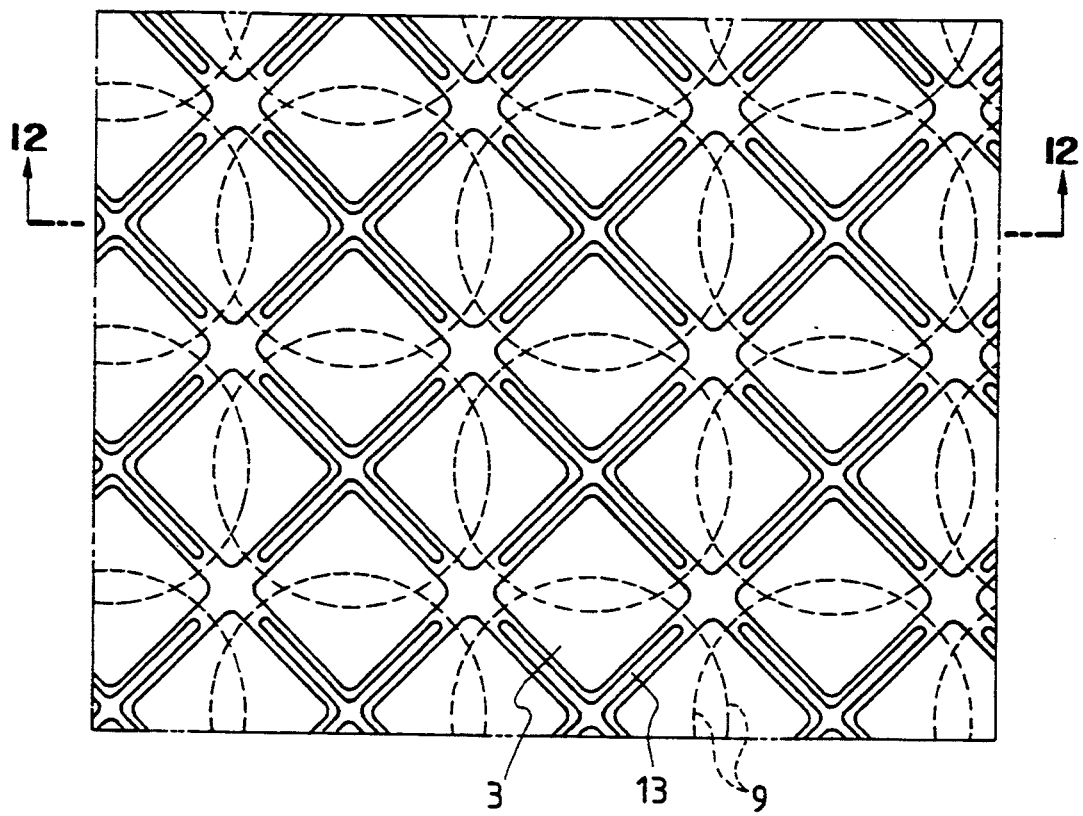
FIG. 7 is a plan view indicating an arrangement of nuclear fuel assemblies and control rods in a reactor core of a boiling water reactor wherein the control rods are adjacently arranged at four sides of the fuel assemblies.
Figure 12:
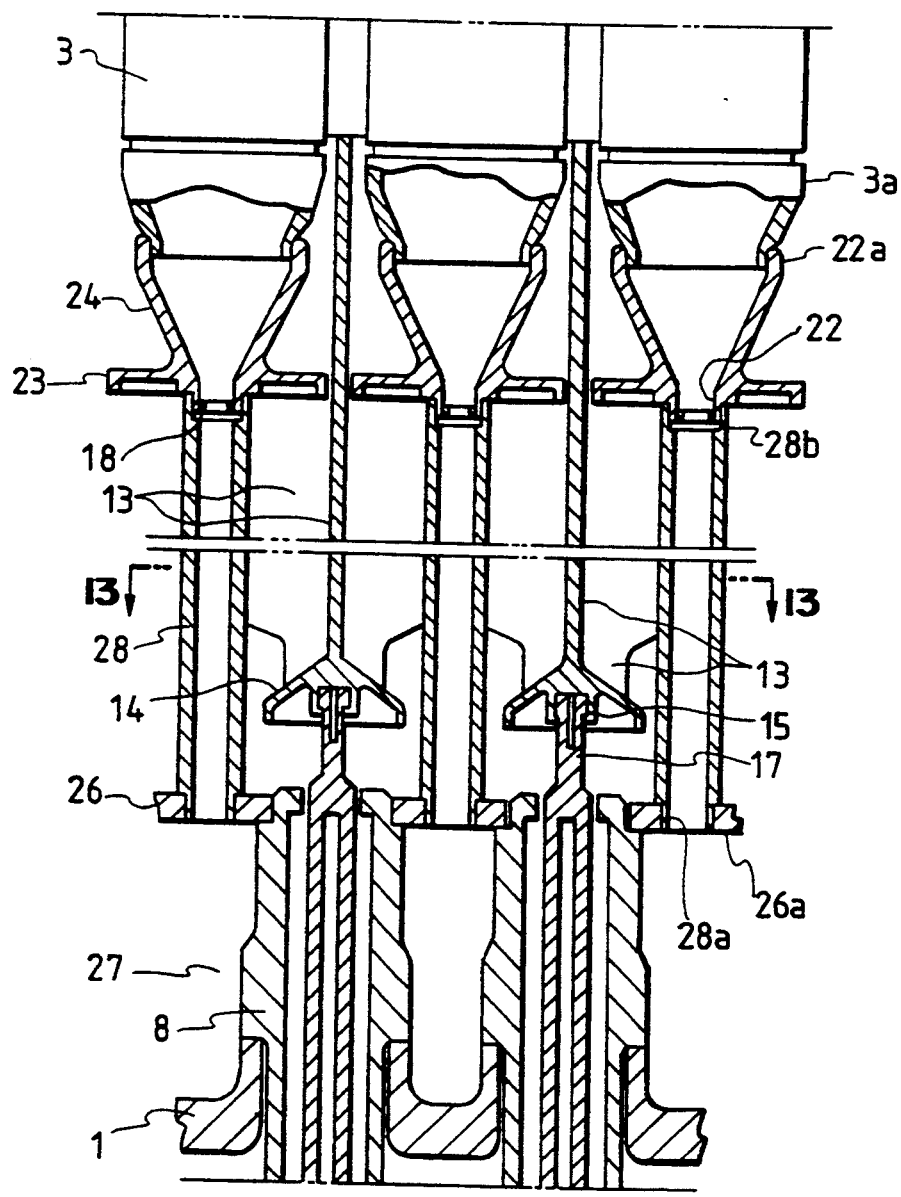
FIG. 12 is a partial vertical cross section of the reactor core lower structure of a boiling water reactor according to the second embodiment.

The second embodiment is shown in FIG. 12. FIG. 12 indicates changes of the portion illustrated as a cross section taken on line B—B in FIG. 7 by being applied the present invention.

Referring to FIG. 12, the control rod driving mechanism housing 8 is welded to the bottom plate of the reactor pressure vessel 1. The lower plenum in the reactor pressure vessel 1 is horizontally divided into two portions, an upper portion and a lower portion, by a partition plate 26 which contacts with the shroud (the numeral 2 in FIG. 3) at outer periphery and is fixed to a step portion at top of the control rod driving mechanism housing 8, and the vessel bottom flow path 27 which accepts the coolant from the internal pumps is formed at lower side of the partition plate 26.

The partition plate 26 has holes 26a. The coolant entrance 28a which is lower end portion of the coolant guide tube 28 is fixed to the hole standing vertically by such means as insertion or welding.

The coolant entrance 22 of the fuel support piece 24 is fixed to the coolant outlet 28b which is upper end portion of the coolant guide tube 28. The fuel support piece 24 is incorporated with the grid plate 23 as well as the first embodiment. The coolant entrance 3a of the fuel assembly 3 is fixed to the coolant outlet 22a which is upper end portion of the fuel support piece 24.

The control rod 13 is connected to the control rod driving rod 17 by the coupling 15. The velocity limiter 14 is fixed to the control rod at downward position of wing portion of the control rod 13. The wing portion of the control rod 13 can move vertically through a slit between the grid plates 23 as same as the first embodiment. In the present embodiment, a control rod guide tube does not exist and the control rod 13 is guided by the grid plate 23.

Figure 13:
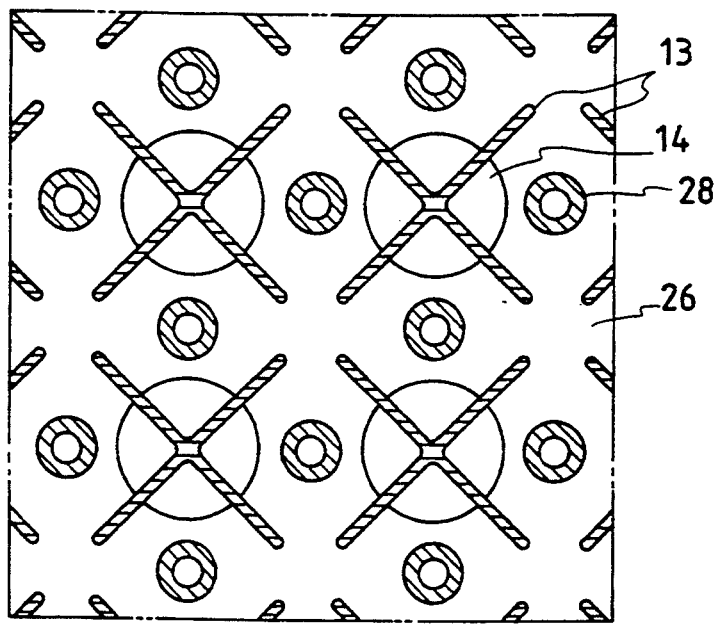
FIG. 13 is a cross section taken on line A—A of FIG. 12.

The FIG. 13 is a horizontal cross section taken on line A—A in FIG. 12. The coolant guide tube 28 is arranged at the center of an interval between two adjacent control rods 13, that means, exactly beneath the fuel assembly 3. Coolant flow path above the partition plate 26 is restricted to inside of the coolant guide tube 28. Accordingly, a function to close coolant flow path is not required to the grid plate 23, but only a function for restraining horizontal moving of the upper portion of the coolant guide tube 28 and the lower portion of the fuel assembly 3 and guiding the control rod is required. Accordingly, the weight of the grid plate can be reduced by drilling holes etc.

In accordance with the present embodiment, a load of the fuel assembly 3 is supported by the coolant guide tube 28, the coolant guide tube 28 is supported by the partitioning plate 26, and the partition plate 26 is supported by the reactor pressure vessel 1 via the control rod driving mechanism housing 8.

The coolant guide tube 28 can be manufactured by only machining on both ends of a standard tube, and an amount of the machining work can be reduced remarkably in comparison with a case using the control rod guide tube.

The coolant supplied to the vessel bottom flow path 27 by internal pumps enters into the coolant guide tube 28 through the vessel bottom flow path 27, and enters into the fuel assembly 3 as an ascending flow through the fuel support piece 24. By reducing the flow path area of the coolant guide tube 28 to substantially equivalent to the coolant entrance area of the fuel support piece 24 and extending the flow path length of the coolant guide tube 28 from the fuel support piece 24 to the upper portion of the control rod driving mechanism housing 8, flow velocity of the coolant entered into the coolant guide tube 28 increases, and consequently, an inertia of the coolant flow increases as much as equivalent to the increased fraction of the coolant flow, and a flow instability of two phase flow in the fuel assembly 3 scarcely causes. Furthermore, flow rate lowering speed at the pump trip becomes moderate and a temporary lowering of CPR can be suppressed.

Figure 14:
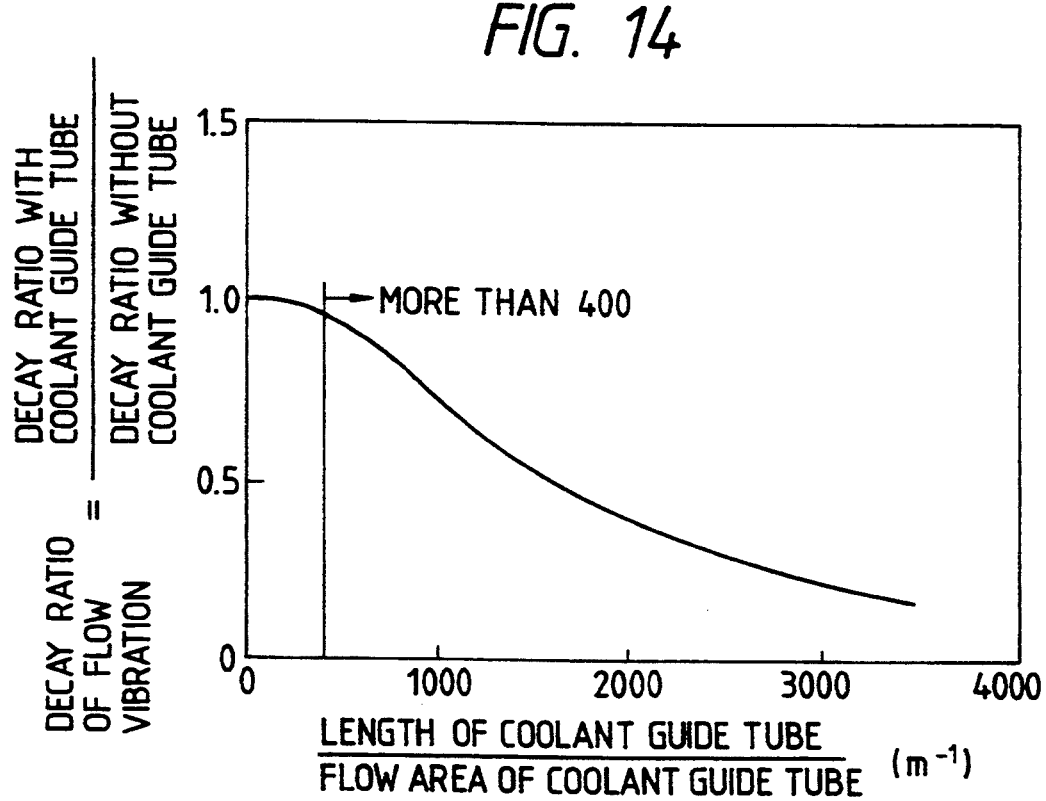
FIG. 14 is a graph indicating a characteristics of the coolant guide tube.

A result of analysis on the coolant guide tube having various lengths and diameters is shown in FIG. 14 as a curved line. The line expresses a relationship between a value, (L/A), which is obtained by dividing the length of the coolant guide tube 28, L, by the flow path area, A, and a relative value of decay ratio which is obtained by dividing the decay ratio of the case when the coolant guide tube 28 exists by the decay ratio of the case when the coolant guide tube 28 does not exist. The decay ratio is a value indicating the degree of flow vibration attenuation, and a small value of the decay ratio means easiness of the flow instability attenuation, that means, a large stability of the coolant flow. Accordingly, when the relative value of decay ratio is small, the effect of the coolant guide tube is large and the flow stability in the fuel assembly, is also large.

In accordance with the result shown in FIG. 14, when the ratio (L/A) of the length L and flow path area A of the coolant guide tube 28 is less than 200, the relative values of the decay ratio are approximately 1, and the effect of the coolant guide tube can not be recognized. And, it is revealed that the effect of the coolant guide tube 28 on the flow stability increases according to increase of the L/A.

As for substantially effective L/A of the coolant guide tube 28, the L/A value at least 400 ($m^{-1}$) is preferable. Because, when the coolant guide tube 28 having a L/A value at least 400 ($m^{-1}$) is used, the decay ratio of the flow vibration becomes less by more than 10% than a case when the coolant guide tube 28 does not exist, and the effect of the coolant guide tube 28 adoption becomes distinguished.

When the coolant guide tube having an inner diameter of 60 millimeters is used, the length of the coolant guide tube 28 which makes the value of the L/A more than 400 ($m^{-1}$) is 1.1 meters. And, an axial interval between the coolant entrance 22 of the fuel support piece 24 and the upper end of the control rod driving mechanism housing 8 is far larger than 1.1 meters.

In accordance with the conventional method, two phases flow instability is prevented by installation of an orifice 18 for generating pressure loss at the entrance of the fuel assembly 3. However, a case wherein the flow instability is prevented by the inertia of the coolant such as the present invention, it becomes possible to reduce the pressure loss of the orifice or to omit the orifice, and consequently, pumping power can be saved.

In order to realize the flow stability in the fuel assembly 3 without changing the axial length of the reactor pressure vessel 1, reducing the inner diameter of the coolant guide tube 28 is the sole method. However, reduction of the inner diameter of the coolant guide tube 28 increases friction loss of the coolant and decreases mechanical strength for supporting the fuel assemblies 3. Accordingly, there is a limit for reducing the inner diameter of the coolant guide tube 28.

(Embodiment 3)

Figure 15:
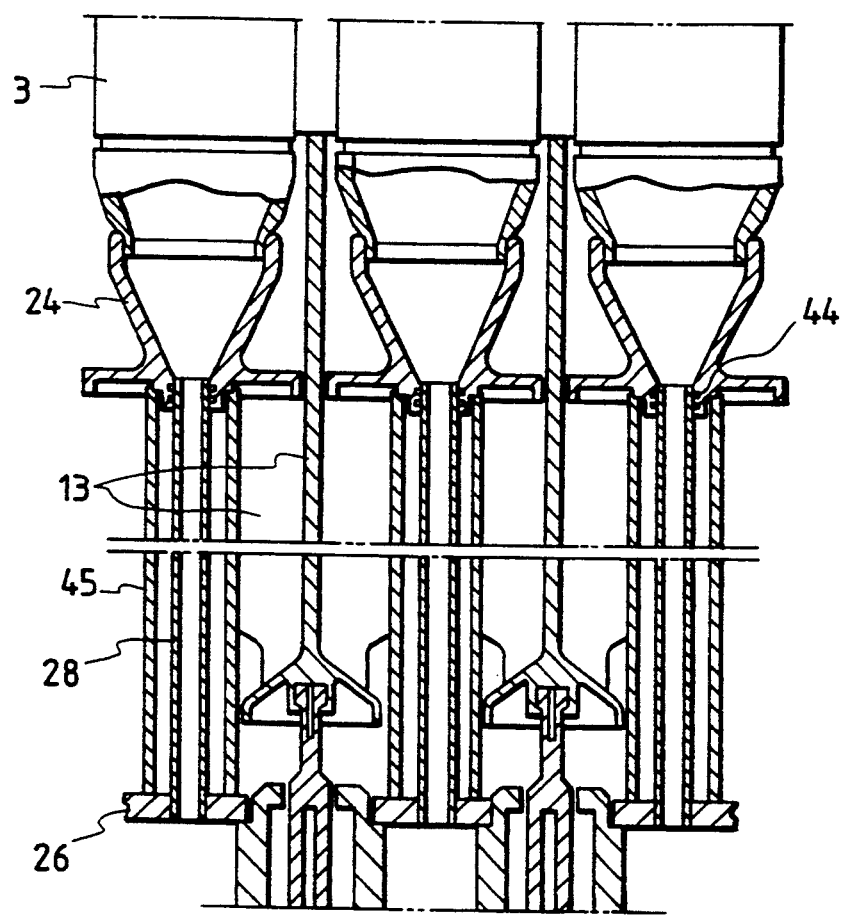
FIG. 15 is a partial vertical cross section of the reactor core lower structure of a boiling water reactor according to the third embodiment.

When the coolant guide tube 28 is too slender to support the fuel assemblies 3 structurally and mechanically, the supporting tube 45 having a higher mechanical strength than the coolant guide tube 28 is installed as a supporting member around the outer periphery of the coolant guide tube 28 in parallel with the coolant guide tube 28 so as to contain the coolant guide tube 28 as the third embodiment shown in FIG. 15. The supporting tube 45 supports the fuel support piece 24 at the upper end, and lower end of the supporting tube 45 is supported by upper surface of the partition plate 26. In the manner described above, even if supporting strength is decreased by reducing the inner diameter of the coolant guide tube 28, the supporting strength is ensured by the supporting tube 45 which supports the load above the fuel support piece 24 and is separated from the coolant guide tube 28. The supporting tube 45 stands perpendicularly and fixed to the partition plate 26 at the lower end by welding etc.

In the above described case, the coolant guide tube 28 is not required for the strength to support the fuel assemblies 3 and others, and consequently, only consideration for giving an inertia to the coolant is necessary when determining the inner diameter of the coolant guide tube 28, and a degree of freedom for selection increases. And, a thin wall thickness of the coolant guide tube 28 can be used. Furthermore, because the supporting tube 45 ensures the axial interval between the partition plate 26 and the fuel support piece 24, preciseness of the length of the coolant guide tube 28 can be loosened by inserting the upper end of the coolant guide tube 28 into the fuel support piece 24. Coolant leakage from the fuel support piece 24 at the inserting portion of the coolant guide tube 28 into the fuel support piece 24 must be reduced by providing the labyrinth 44 etc.

The fuel assemblies 3 mutually differ in output power depending on locations in the reactor core and in required amount of coolant, and accordingly, adjusting the inner diameter of the coolant guide tube 28 depending on the location in the reactor core so as to ensure the necessary amount of the coolant is preferable. Additionally, the fuel assemblies 3 located at the outermost periphery of the reactor core have small output power and scarcely cause The flow instability. Therefore, the coolant guide tube 28 for the flow stability is not necessary.

In accordance with a method other than the present embodiment, for example, the weight of the fuel assemblies 3 at the outermost periphery of the reactor core are supported by the shroud (not shown in the figure), holes for the coolant flow are drilled in the partition plate 26, and the coolant enters into the fuel assembly 3 through a space beneath the grid plate 23, the coolant guide tube 28 for the fuel assemblies at the outermost periphery of the reactor core can be omitted.

The control rod 13 can be exchanged as same as the previous embodiments, that is, four fuel assemblies 3 and the fuel support pieces 24 surrounding the control rod 13 are removed first, and the coupling 15 connecting the control rod driving rod 17 and the control rod 13 is separated.

Figure 6:
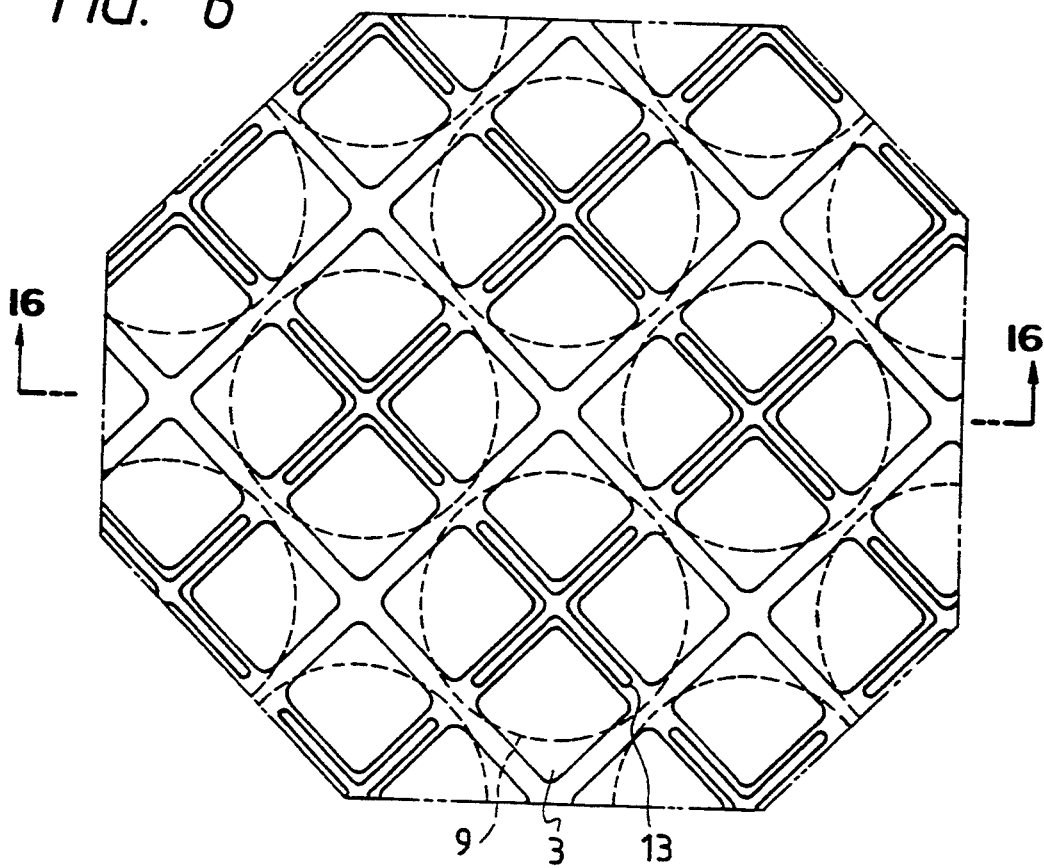
FIG. 6 is a plan view indicating an arrangement of nuclear fuel assemblies and control rods in a reactor core of a conventional boiling water reactor.

In accordance with the second and third embodiments, the control rod guide tube is omitted and the coolant guide tube is arranged to each corresponding fuel assembly. Therefore, the above embodiments are preferable not only for the reactor core arrangement wherein the control rods locate adjacently at every four sides of the fuel assembly, but also usable for the conventional reactor core arrangement shown in FIG. 6 and other reactor core arrangement wherein a space for providing the coolant guide tube exists beneath the fuel assembly.

(Embodiment 4)

Figure 16:
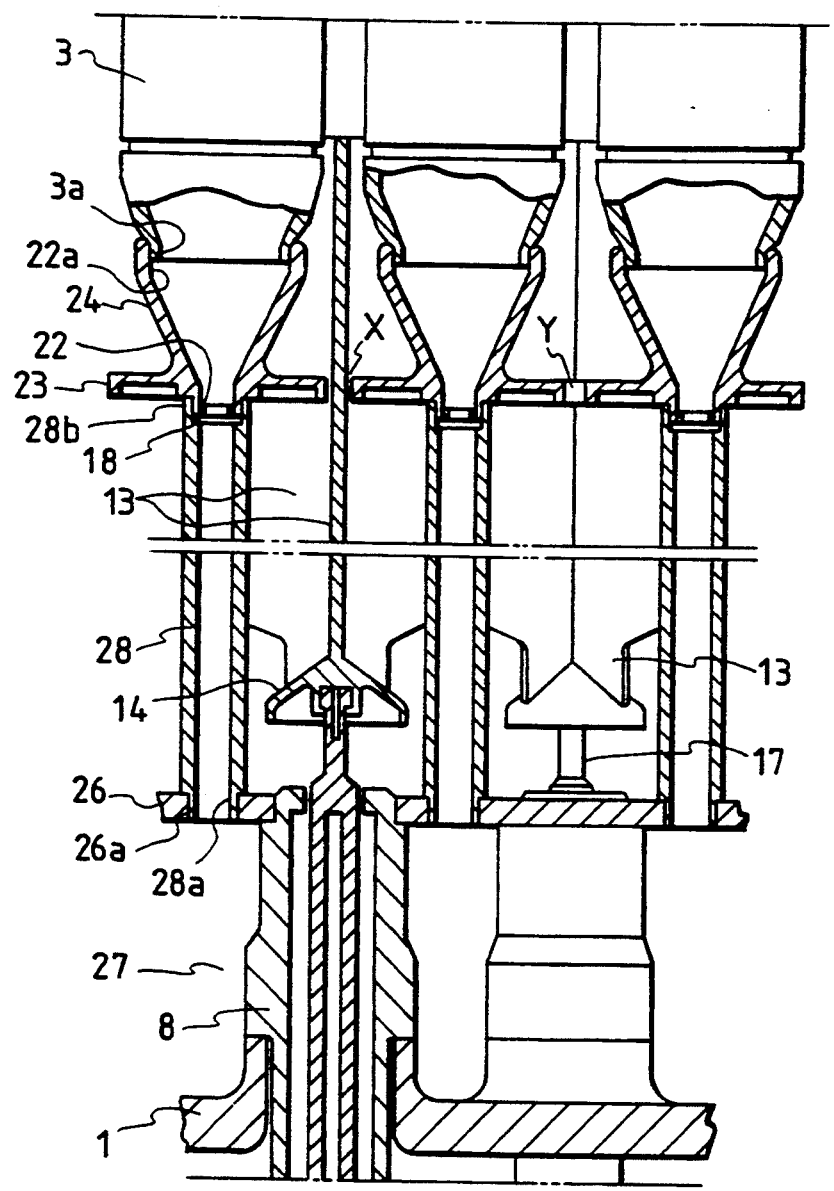
FIG. 16 is a partial vertical cross section of the reactor core lower structure of a boiling water reactor according to the fourth embodiment.

An example of application of the present invention using the coolant guide tube to the conventional reactor core arrangement is shown in FIG. 16 as the fourth embodiment. FIG. 16 indicates changed portions by applying the present invention to the vertical cross section taken on line B—B in FIG. 6. The control rod 13 is arranged to every two fuel assemblies 3. The control rod 13 is connected in a detachable manner to the control rod driving rod 17 by the coupling 15. The partition plate 26 is fixed at the upper end portion of the control rod driving mechanism housing 8 wherein the control rod driving rod 17 is provided in a manner so as to move vertically. The lower plenum in the reactor pressure vessel 1 is divided horizontally into two sections, an upper portion and a lower portion, by the partition plate 26, and the coolant supplied by the internal pumps enters into the vessel bottom flow path 27 beneath the partition plate 26. The partition plate is provided with holes 26a, and the coolant entrance 28a which is the lower end of the coolant guide tube 28 is inserted into the hole or is fixed to the hole standing perpendicularly by welding. The coolant entrance 22 of the fuel support piece 24 is inserted into the coolant outlet 28b, that is, the upper end of the coolant guide tube 28. The structure of the fuel support piece 24 is as same as the fuel support piece in the second embodiment, but differs in dimensions. The coolant entrance 3a of the fuel assembly 3 is mounted on the coolant outlet 22a, that is, the upper end of the fuel support piece. Because of the arrangement of one control rod per two fuel assemblies, there are two kinds of paths, one is the path X wherein the control rod 13 penetrates the path vertically and another is the path Y wherein the control rod 13 does not penetrate the path, in the grid plate 23 of the fuel support piece 24. If the shape of the grid plate 23 is altered depending on whether the grid plate 23 locates adjacent to the control rod 13 or not, fabrication and assembling of the grid plate become complex. The partition plate 26 prevents the coolant in the flow path 27 from escaping upward, and accordingly, a function to prevent the coolant from leakage is not required for the grid plate 23. Therefore, unification of shapes of the grid plate adjacent to the control rod and not adjacent to the control rod to an uniform shape having slits for passing through the control rod 13 at each sides of the grid plate is preferable.

In accordance with the present embodiment, the coolant supplied to the vessel bottom floe path 27 by the internal pumps enters into the coolant guide tube 28, accelerates and increases inertia. Subsequently, the coolant is supplied to the fuel assembly 3 from the coolant guide tube 28 via the fuel support piece 24. The control rod 13 moves vertically through a slit between the grid plates 23 with pushing or pulling by the control rod driving rod 17.

(Embodiment 5)

The fifth embodiment of the present invention which is applied to the other reactor core arrangement is explained hereinafter.

Figure 17:
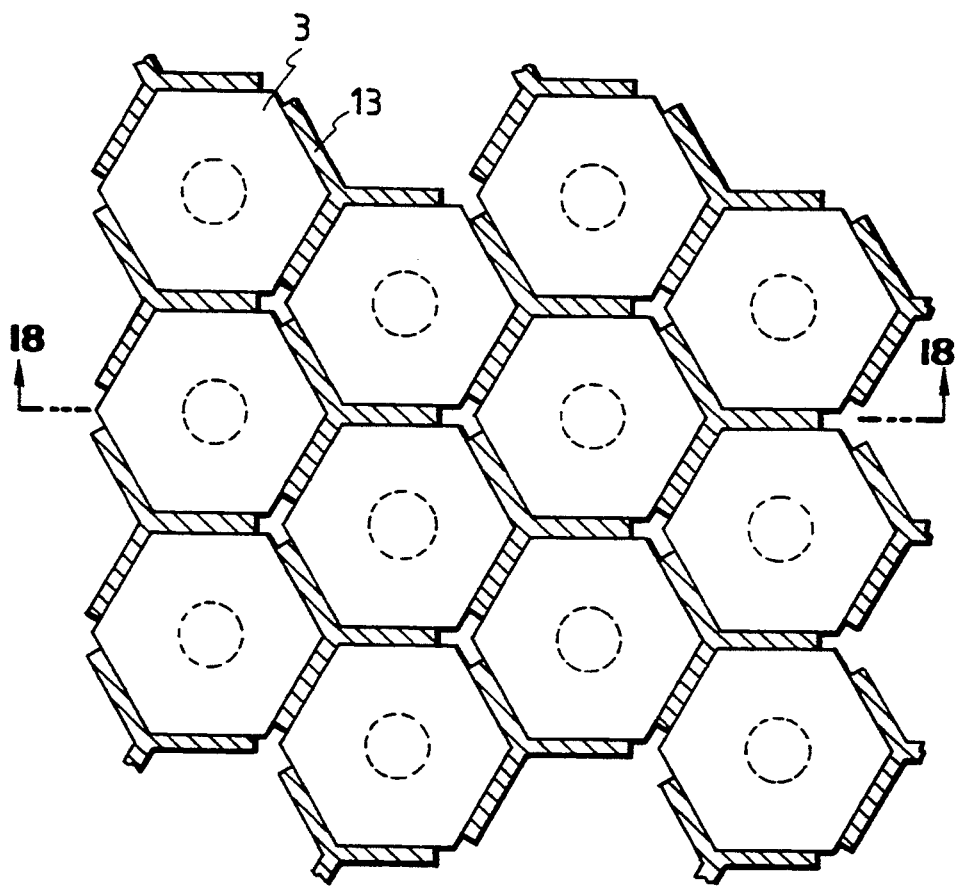
FIG. 17 is a partial horizontal cross section of the reactor core according to the fifth embodiment.
Figure 18:
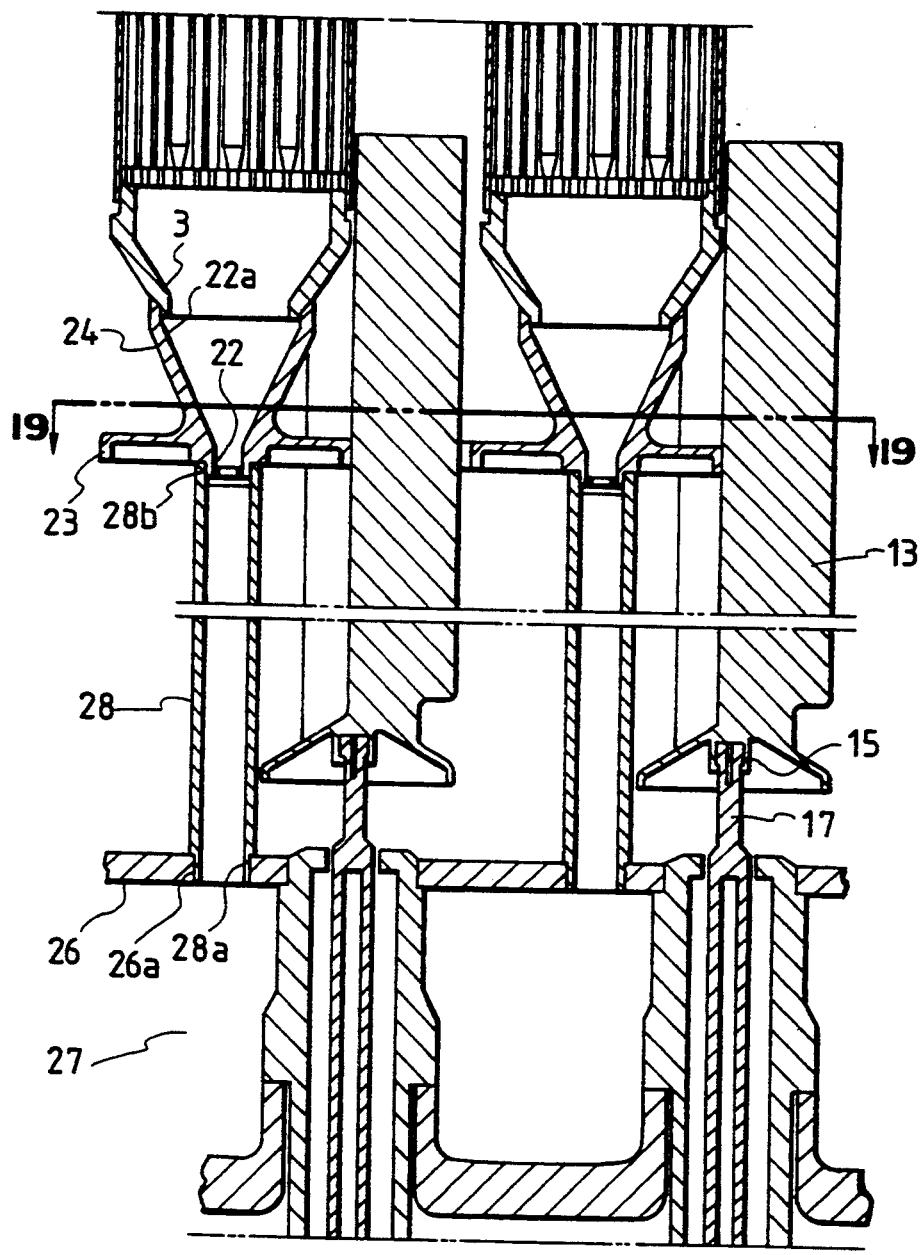
FIG. 18 is a cross section taken on line A—A of FIG. 17 indicating a reactor core lower structure of a boiling water reactor of FIG. 17.

A reactor core arrangement comprising the fuel assembly 3 having a hexagonal cross section and the control rod having a Y shaped cross section is indicated in FIG. 17. Even with the present reactor core arrangement, the control rods 13 can be arranged at locations adjacent to every sides of the fuel assembly 3. A cross section taken on line A—A in FIG. 17 is shown in FIG. 18.

The control rod 13 is connected to the control rod driving rod 17 by the coupling 15 in a detachable manner. The partition plate 26 is fixed at the upper end portion of the control rod driving mechanism housing 8 wherein the control rod driving rod 17 is provided in a manner so as to move vertically. The lower plenum in the reactor pressure vessel 1 is divided horizontally into two sections, an upper portion and a lower portion, by the partition plate 26, and the coolant supplied by the internal pumps enters into the vessel bottom flow path 27 beneath the partition plate 26. The partition plate is provided with holes 26a, and the coolant entrance 28a which is the lower end of the coolant guide tube 28 is inserted into the hole or is fixed to the hole standing perpendicularly by welding. The coolant entrance 22 of the fuel support piece 24 is inserted into the coolant outlet 28b, that is, the upper end of the coolant guide tube 28.

Figure 19:
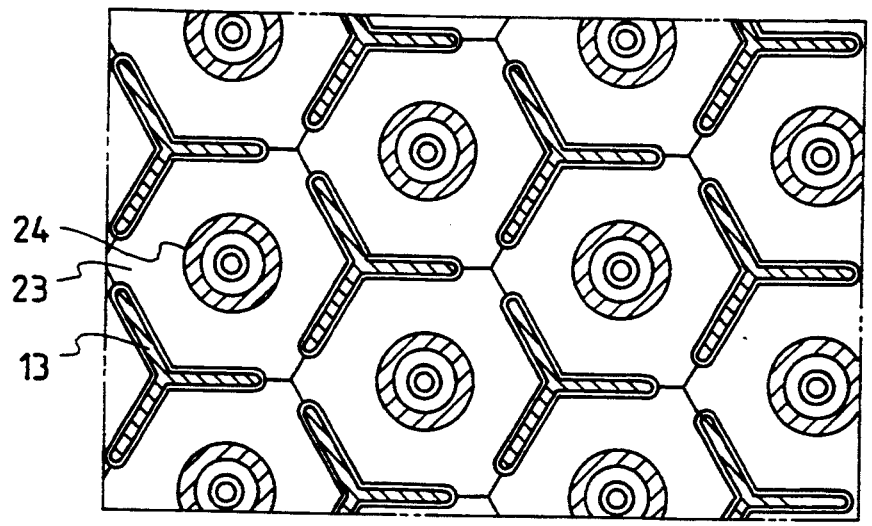
FIG. 19 is a cross section taken on line B—B of FIG. 18.

The grid plate 23 which is integrated with the fuel support piece 24 forms a hexagonal shape as indicated in FIG. 19, and horizontal displacement is prevented by mutual contact of the adjacent grid plates 23 at three corners which do not contact with the control rod 13. Necessary slits for vertical moving of the control rod 13 are formed as control rod moving paths at the sides of the grid plate 23 adjacent to the control rod 13. the coolant entrance 3a of the fuel assembly 3 is mounted on the coolant outlet 22a, that is, the upper end of the fuel support piece 24.

In accordance with the present embodiment, the coolant supplied to the vessel bottom flow path 27 by the internal pumps enters into the coolant guide tube 28, accelerates and increases inertia. Subsequently, the coolant is supplied to the fuel assembly from the coolant guide tube 28 via the fuel support piece 24. The control rod 13 moves vertically through a slit between the grid plates 23 with pushing or pulling by the control rod driving rod 17.

According to the present embodiment, occurrence of the flow instability in the fuel assembly becomes scarce, and temporary lowering of thermal margin at pump trip can be reduced.

(Embodiment 6)

The sixth embodiment is explained hereinafter referring to FIGS. 20, 21, and 22.

The partition plate 26 dividing the lower plenum horizontally in two sections, an upper portion and a lower portion, is fixed on the upper end portion of the control rod driving mechanism housing 8 which is fixed to the reactor pressure vessel 1. The lower portion beneath the partition plate 26 becomes the vessel bottom flow path 27 which accepts the coolant supplied by internal pumps. The partition plate 26 is supported by the control rod driving mechanism housing 8. The coolant entrance 28a, that is the lower end of the coolant guide tube 28, is fitted into or welded to the hole 26a which is drilled in the partition plate 26, and the coolant guide tube 28 stands perpendicularly. The coolant entrance 28a is connected to the vessel bottom flow path 27 so as to make the coolant flow. The coolant entrance 22 of the fuel support piece 30 is fitted into the coolant outlet 28b which is the upper end of the coolant guide tube 28. The coolant entrance 3a of the fuel assembly 3 is mounted on the coolant outlet of the fuel support piece 30.

Figure 20:
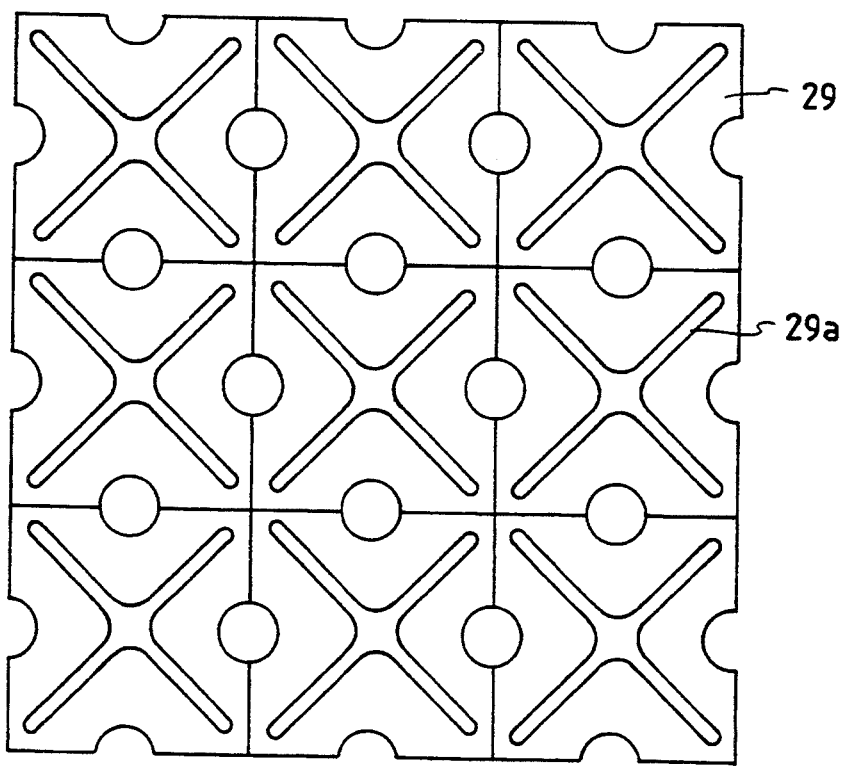
FIG. 20 is a plan view indicating a combination of the divided grid plate which is adopted in the sixth embodiment.

The grid plate 29 which is provided at horizontal intervals between upper portion of the coolant guide tubes 28 is divided into approximately square shape as shown in FIG. 20, and the cruciform slit which allows vertical movement of the control rod 13 is provided inside as a moving path of the control rod 13. Furthermore, the middle portion of each four sides of the grid plate 29 is cut away semicircularly 29b so as to form a hole to pass through the upper end of the coolant guide tube 28. The side portions other than the semicircular cutaway 29b of the grid plate contact with the adjacent grid plates so as to prevent horizontal displacement mutually.

The upper end of the coolant guide tube 28 passes through the semicircular cutaway portion 29b of the grid plate 29, and supports the grid plate by a step portion which is fabricated in the vicinity of the upper end of the grid plate 29. And, the control rod having the cruciform cross section as shown in FIG. 22 passes through the hole 29a.

The brim 31 projecting horizontally outward from the fuel support piece 30 is extended onto the grid plate 29 in order to prevent the grid plate 29 from a displacement upward.

The lower end of the control rod 13 is connected detachably to the control rod driving rod 17 via the coupling 15.

The weight of the fuel assembly is transferred to the bottom plate of the reactor pressure vessel 1 via the fuel support piece 30, the grid plate 29, the coolant guide tube 28, and the control rod driving mechanism housing 8. Because of separation of the grid plate 29 and the fuel support piece 30, the weight of the fuel support piece can be reduced, and accordingly, control rod changing operation which will be described later can be facilitated. And, the weight of the grid plate 29 can be reduced because a function to close flow paths is not required for the grid plate.

In the previous embodiment 2, the velocity limiter 14 locates in a wide stagnant coolant area, and accordingly, a performance of the velocity limiter 14 is inferior to a conventional velocity limiter 14 which is contained in a control rod guide tube. Therefore, the velocity limiter 32 having a high performance is provided.

A composition of the control rod velocity limiter 32 is explained hereinafter.

The cylinder 33 having a piston 34 inside is fixed at outer periphery of the coolant guide tube by welding and so on. The lower end of the cylinder 33 opens widely, and an orifice is formed at the upper end. One end of the wire 37 is connected to the piston 34, and middle of the wire 37 is withdrawn through the orifice at the upper end of the cylinder 31 and winds to the pulley 36. The pulley is fixed to the upper end of the cylinder 33. The other end of the wire 37 is fixed to a portion in the vicinity of the lower end portion of the control rod 13 via the hanger 35.

Length of the wire 37 is so determined that the piston 34 locates at a position in the vicinity of the upper end of the cylinder 33 when the control rod 13 is withdrawn to the lowermost position from the reactor core and at a position in the vicinity of the lower end of the cylinder 33 when the control rod is inserted to the uppermost position in the reactor core. According to the above described structure, a force to insert the control rod 13 into the reactor core by a self weight of the piston 34 is always added to the control rod 13.

During descending the piston 34, water beneath the piston 34 flows out through an opening at lower portion of the cylinder 33 and does not disturb the descent of the piston 34. Accordingly, the velocity limiter 32 does not disturb but helps insertion of the control rod 13 into the reactor core. When the control rod 13 is withdrawn, the piston is hung up reversely to the gravity, and water above the piston 34 flows out through the orifice wherein the wire 37 is withdrawn through, but the flow does not disturb the withdrawal of the control rod 13 because the piston 34 moves slowly. When the control rod falls fast, the piston 34 moves fast and resistance of water which flows out through the orifice becomes large and falling speed of the control rod is restrained.

Figure 21:
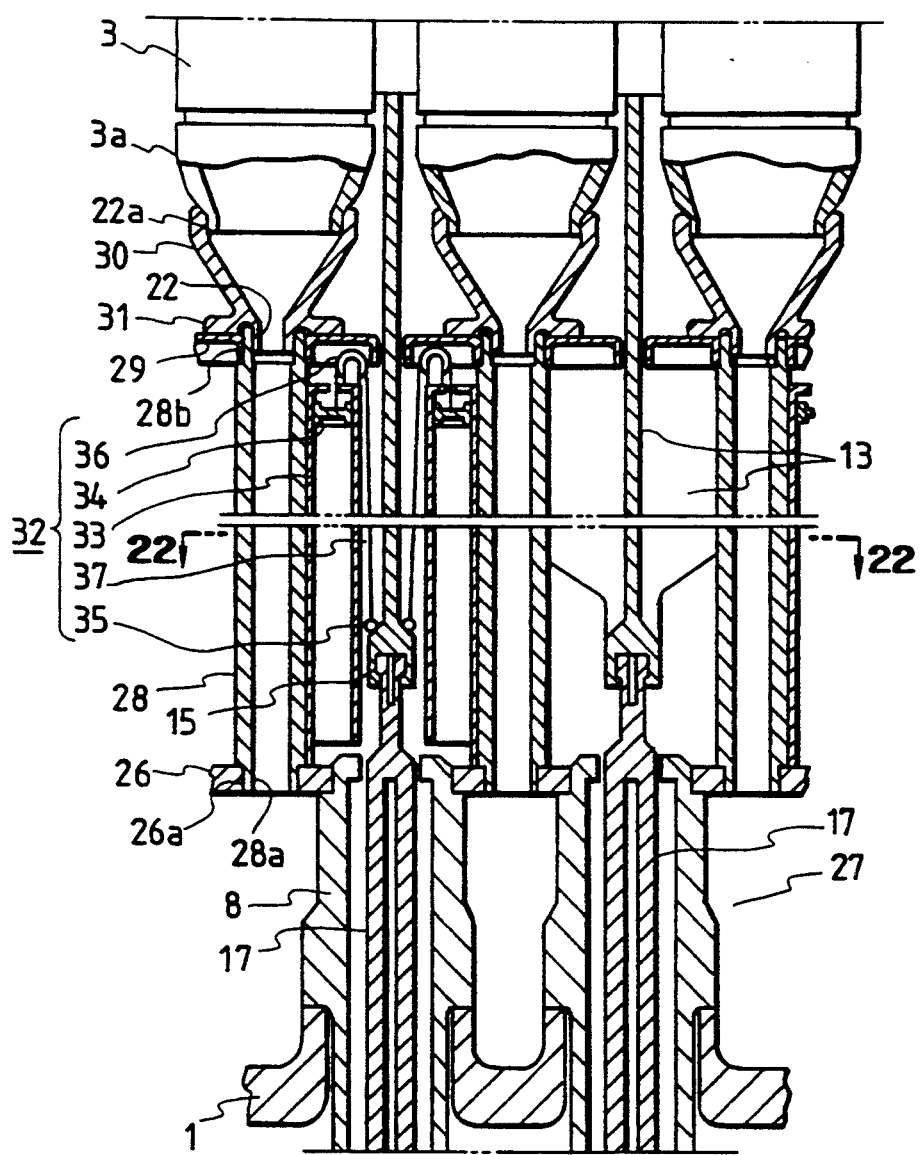
FIG. 21 is a partial vertical cross section of the reactor core lower structure of a boiling water reactor according to the sixth embodiment.
Figure 22:
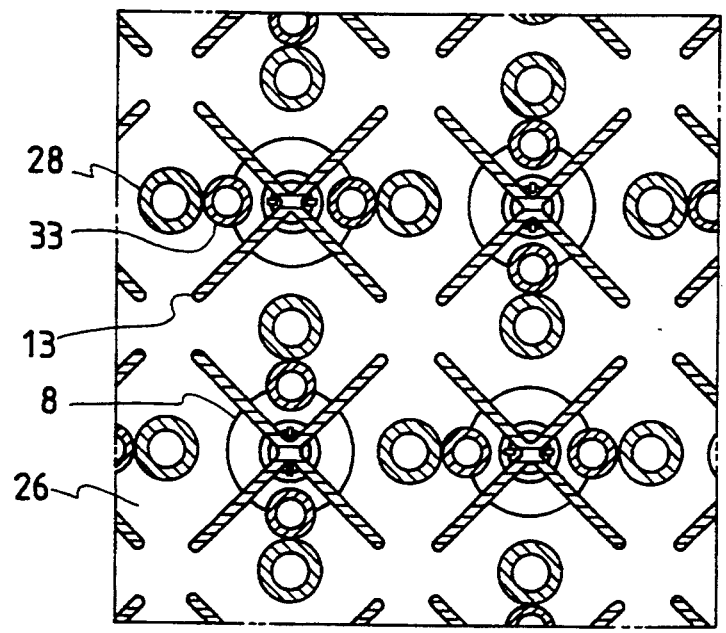
FIG. 22 is a cross section taken on line A—A of FIG. 21.

FIG. 22 is a cross section taken on line A—A in FIG. 21. When providing a velocity limiter 32 to each control rod 13, an unbalanced force is added to the control rod 13. Accordingly, providing a pair of facing two velocity limiters 32 as shown in FIG. 22, or four velocity limiters 32 per a control rod 13 is preferable.

2Detaching the grid plate 29 becomes unnecessary in the exchanging operation of the control rod 13, if a size of the hole 29a of the grid plate 29 is so determined that the coupling attached with the hanger 35 can pass through the hole 29a.

The exchanging operation of the control rod 13 is performed in the steps explained hereinafter.

First, four fuel assemblies 3 and the fuel support pieces 30 surrounding the control rod 13 are disassembled. After disconnecting the coupling 15 which connects the control rod driving rod 17 and the control rod 13, the control rod is inserted into the uppermost position of the reactor core, and the control rod can be withdrawn by detaching the wire 37 from the hanger 35. Assembling of the new control rod 13 is performed by the steps reverse to the disassembling of the control rod 13. The exchanging operation without disassembling the grid plate 29 prevents mutual loosening of the grid plates 29, that means, horizontal displacements of the control rods 13, the fuel assemblies 3, and the coolant guide tubes 28 which are not disassembled can be prevented. The coolant supplied by internal pumps into the vessel bottom flow path 27 enters each of the coolant guide tubes 28 and accelerates, and become ascending flows having large inertia. The ascending coolant flow is supplied into the fuel assembly 3 via the fuel support piece 30 as the ascending flow.

In the present embodiment, occurrence of flow instability of the coolant in the fuel assembly becomes scarce, and the temporary lowering of the thermal margin at the pump trip occurrence can be reduced.

Furthermore, weight of the fuel support piece 30 can be reduced as much amount as the grid plate 29 is not integrated, and the exchanging operation of the control rod 13 can be facilitated because disassembling of the grid plate 29 is not necessary. Furthermore, The horizontal displacement of structural members of the reactor core and the lower portion of the reactor core at the control rod exchanging operation can be prevented. Besides, the velocity limiter 32 always adds the control rod with a force to insert the control rod into the reactor core, and accordingly, maintains safety. Additionally to the above described effects, a large braking effect can be expected because a braking force to an ascending speed of the piston 34 is added preferably by a flow limiting function of the orifice at the control rod falling down.

(Embodiment 7)

Figure 1:
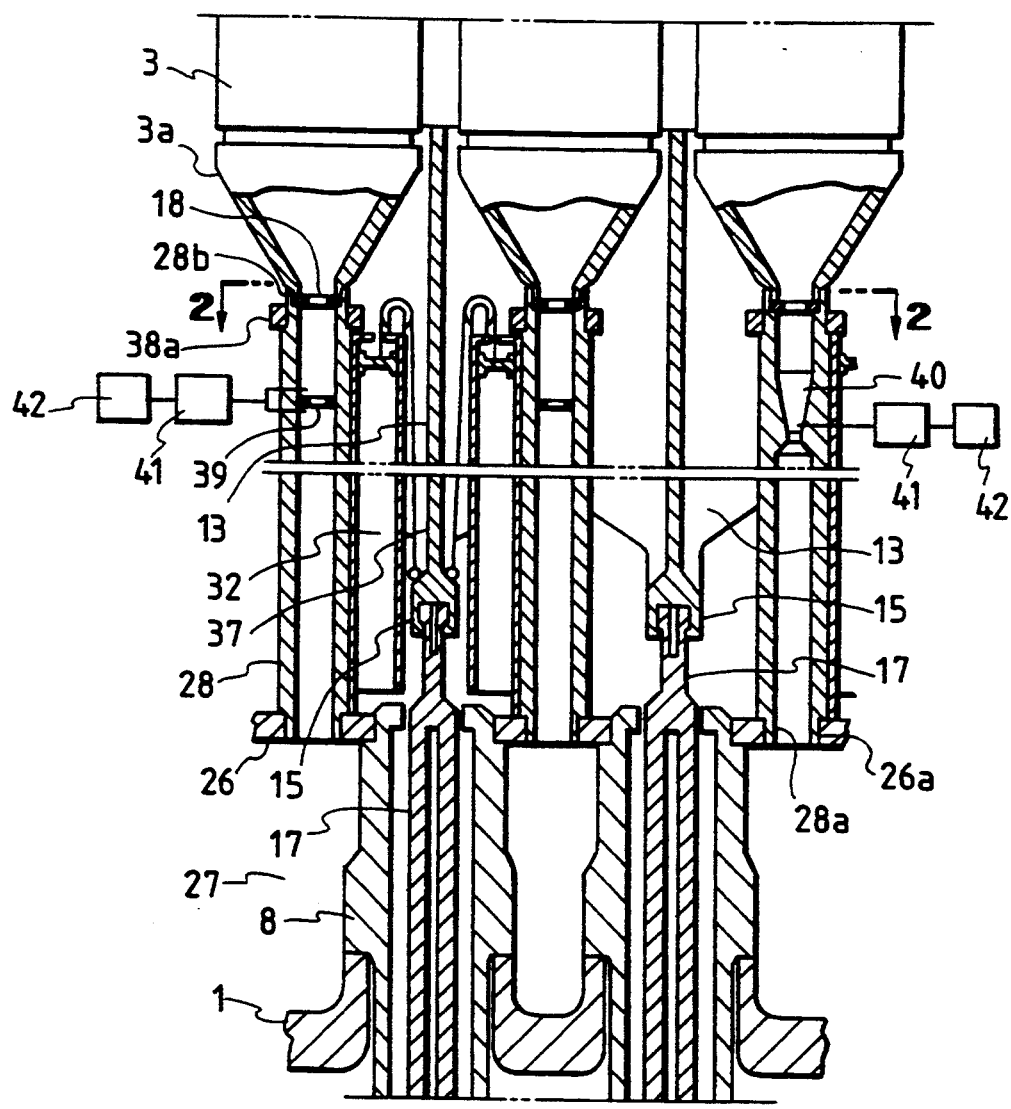
FIG. 1 is a partial vertical cross section of the reactor core lower structure of the boiling water reactor in the seventh embodiment.
Figure 2:
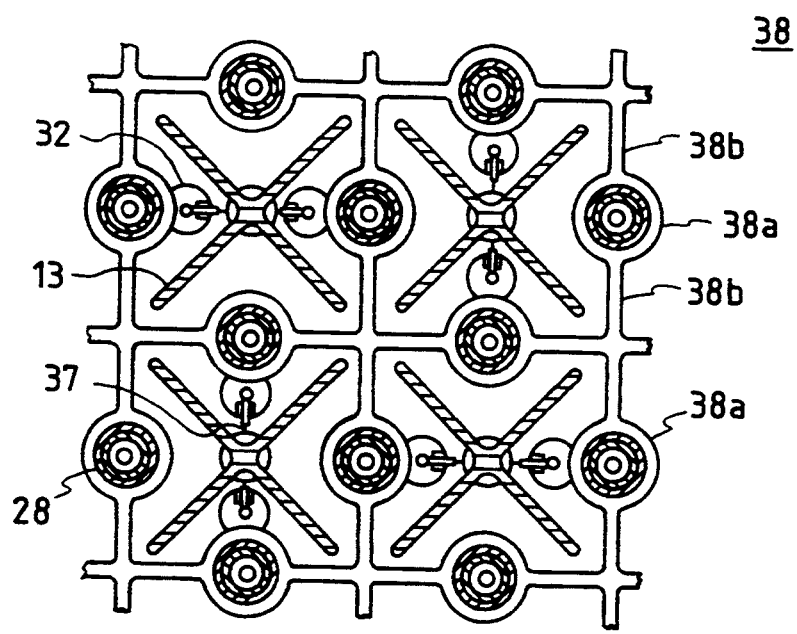
FIG. 2 is a cross section taken on line A—A of FIG. 1.

The seventh embodiment is explained hereinafter referring to FIGS. 1 and 2.

The control rod driving mechanism housing 8 penetrating a bottom plate of the reactor pressure vessel 1 is fixed to the bottom plate by welding. The partition plate 26 is fixed to upper end portion of the control rod driving mechanism housing 8. Lower portion of the partition plate forms the vessel bottom flow path 27, and coolant supplied by internal pumps enters into the vessel bottom flow path 27.

The hole 26a is drilled in the partition plate 26. The coolant entrance 28a of the coolant guide tube 28 is fixed to or welded to the hole 26a. The coolant guide tube 28 stands perpendicularly to the partition plate 26.

The lower end of the coolant entrance 3a of the fuel assembly 3 is fixed to the coolant outlet 28b, that is, the upper end of the coolant guide tube 28. The lower end of the coolant entrance 3a of the fuel assembly 3 is more squeezed than coolant entrance 3a of the other embodiments in order to make the above described fitting possible.

In the manner as above described, the fuel assembly 3 is supported by the coolant guide tube 28, the coolant guide tube is supported by the partition plate 26, and the partition plate 26 is supported by the reactor pressure vessel 1 via the control rod driving mechanism housing 8. In the above described supporting system, the fuel support piece 24, 30 which are used in the other embodiments are not adopted.

The grid plate 38 restrains the upper portion of the coolant guide tube 28. The grid plate 38 comprises the fixing portion 38a which restrains the coolant guide tube 28 and the grid portion 38b which connects the fixing portions mutually as shown in FIG. 2. The coolant guide tube 28 is furnished with a step portion at upper outer peripheral portion, and the grid plate 38 is supported by the coolant guide tube 28 by placing the fixing portion 38a on the step.

The control rod 13 is connected to the control rod driving rod 17 detachably via the coupling 15. The same velocity limiter 32 as the one adopted in the sixth embodiment is furnished to the control rod 13. Although the grid plate 38 does not have a function to guide the control rod 13, it does not make any problem because side walls of the fuel assembly 3 just above the grid plate guides the control rod 13. And, disconnection of the wire 37 is facilitated because the velocity limiter 32 does not have any cover, and a necessary space for the control rod exchange can be maintained only by removing four fuel assemblies around the control rod 13.

Horizontal displacement of the fuel assemblies 3 and the other control rods 13 does not occur because the grid plates 38 restrain the coolant guide tube 28 even at the control rod 13 exchange.

The lower portion of the fuel assembly 3 differs from conventional one in shape because the lower portion of the fuel assembly 3 is directly fixed to the upper portion of the coolant guide tube 28, but simplification of the structure, reduction in amount of used metallic material, reduction in amount of radioactive waste, and facilitation of the control rod exchange are achieved by disuse of the fuel support piece.

The fuel assembly 3 corresponds to one coolant guide tube 28 respectively. Accordingly, an amount of coolant which enters in each fuel assembly 3 can be detected by installing a means for generating differential pressure such as an orifice 39 or a venturi 40 in the coolant guide tube 28, converting the differential pressure to an electric signal on the amount of coolant flow, and reading out the electric signal by an indicator or the indicator-recorder 42.

The entrance orifice 18 for adjusting flow distribution is installed at coolant entrance 3a of the fuel assembly 3, and integrating the entrance orifice 18 with the orifice for flow rate measurement 39 or the venturi 40 so as to have two functions together is possible. However, diameter of the orifice varies depending on the coolant distribution, and the amount of the coolant flow varies even with the same differential pressure of the orifice. Accordingly, the flow measurement becomes complex. The entrance orifice 18 is a small piece and manufacturing and installation are simple. Therefore, separation of the entrance orifice 18 from the orifice for flow rate measurement 39 or the venturi 40 is preferable.

The coolant is supplied to the vessel bottom flow path 27 by internal pumps, and enters into the fuel assembly 3 as an ascending flow via the coolant guide tube. The coolant accelerates its velocity when passing through the coolant guide tube, and obtain a larger inertia than before entering the coolant guide tube. Accordingly, occurrence of two phases flow instability in the fuel assembly becomes scarce. And, a decreasing rate of the coolant flow at a pump trip occurrence becomes moderate and the temporary lowering of the CPR can be suppressed.

In accordance with the present embodiment, the lower structure of the reactor core can be simplified, an amount of the used metallic material and the radioactive waste can be reduced, the exchanging operation of the control rod can be simplified, and an amount of the coolant flow per each fuel assembly can be measured, in addition to improvement of flow stability of the coolant and the temporary lowering of thermal margin at the pump tripping.

(Embodiment 8)

The eighth embodiment is explained hereinafter.

Figure 4:
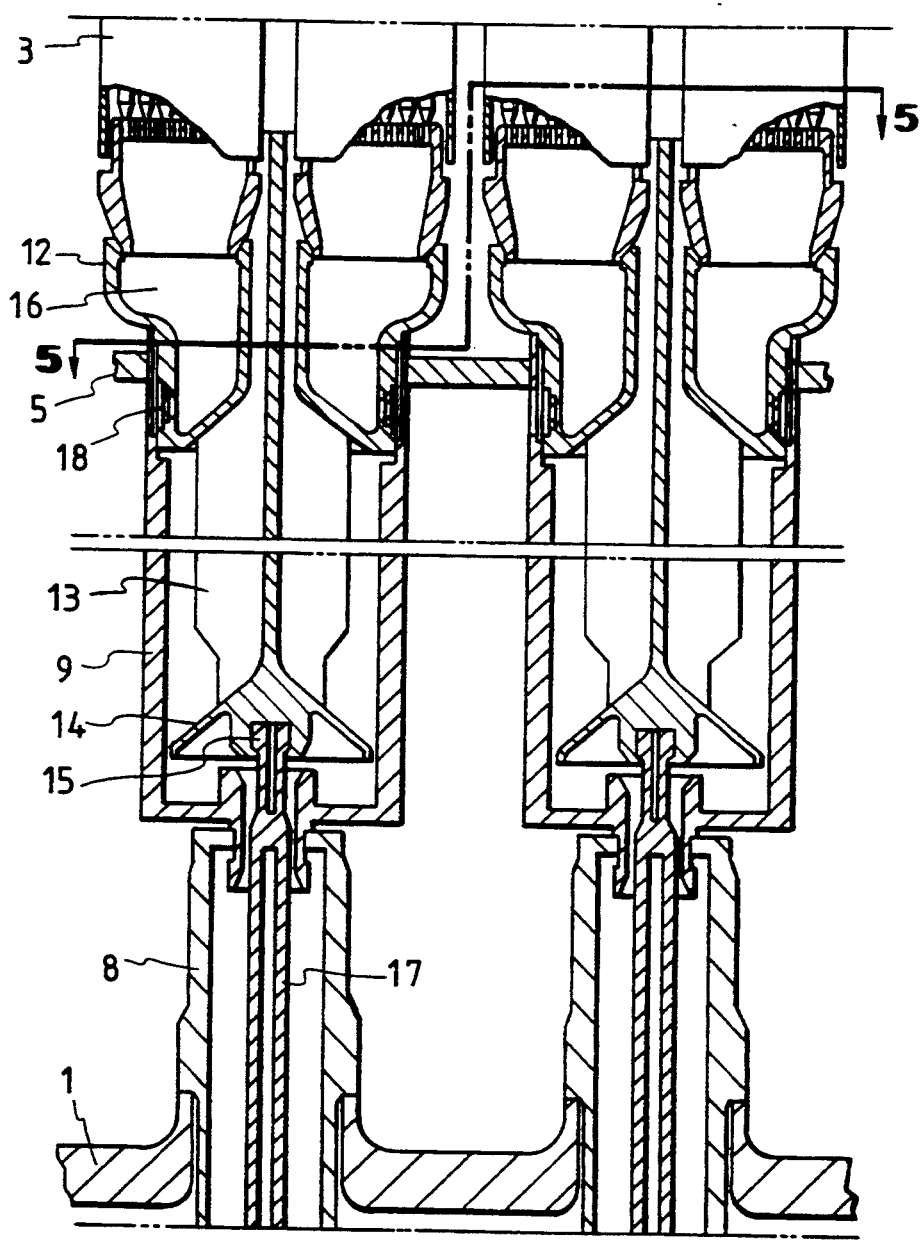
FIG. 4 is a partial vertical cross section of the reactor core lower structure of a conventional boiling water reactor.
Figure 23:
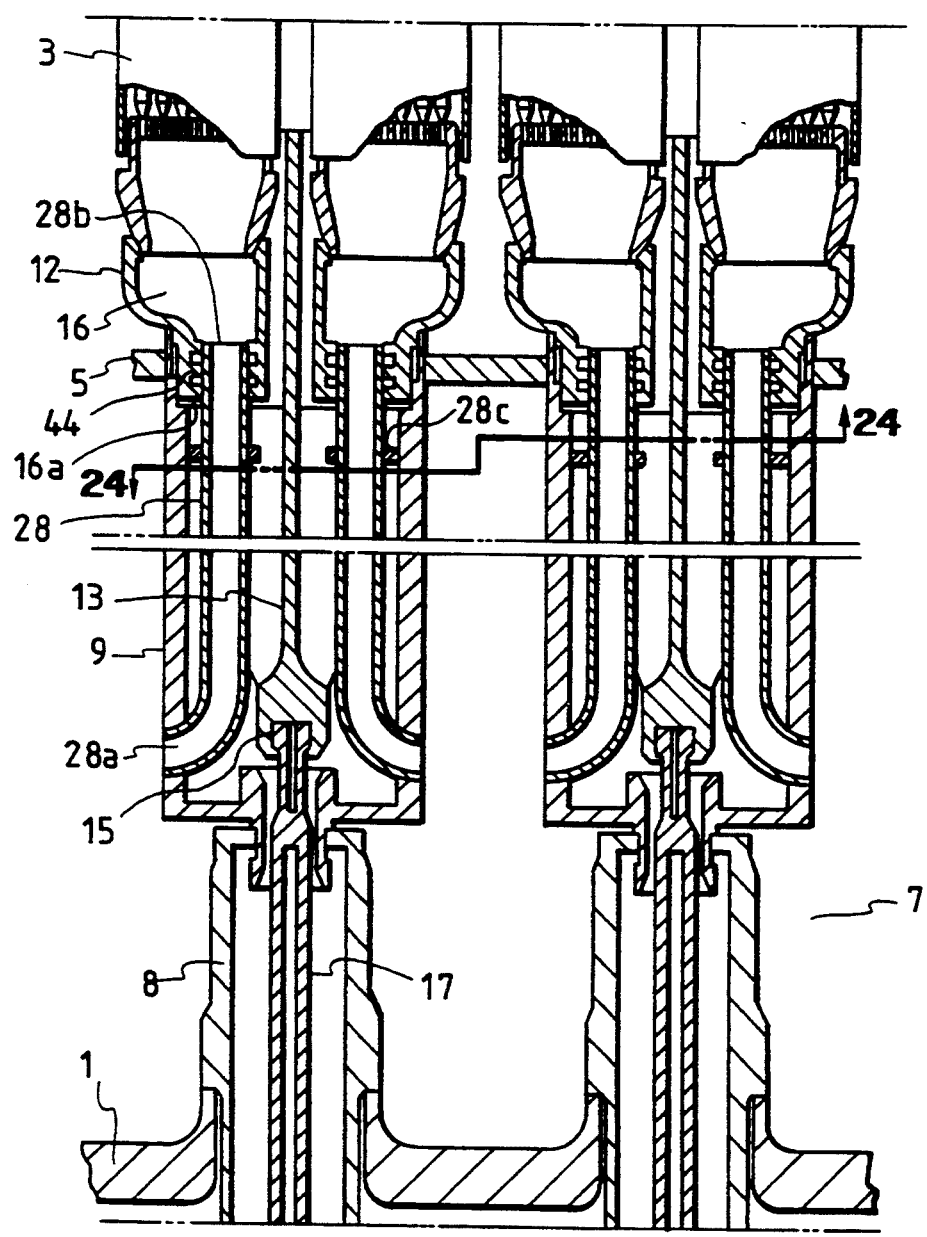
FIG. 23 is a partial vertical cross section of the reactor core lower structure of a boiling water reactor according to the eighth embodiment.

Referring to FIG. 23, the control rod driving mechanism housing 8 which penetrates a bottom plate of the reactor pressure vessel 1 is fixed to the bottom plate of the reactor pressure vessel by welding. A lower end of the control rod guide tube 9 is connected to an upper end of the control rod driving mechanism housing 8. The control rod guide tube 9 contains the control rod 13. The control rod 13 does not have the velocity limiter 14 which is previously shown in FIG. 4. There is a control rod drive mechanism which is able to detect disconnection of the control rod 13 and the control rod driving rod 17. With the above described control rod drive mechanism, fall of the control rod 13 can be prevented and the velocity limiter 14 becomes unnecessary.

A lower end of the control rod 13 is connected detachably to an upper end of the control rod driving rod 17 with the coupling 15. The control rod driving rod 17 is contained movably in a vertical direction in the control rod driving mechanism housing 8.

The grid plate 5 wherein an upper portion of the control rod guide tube 9 is inserted partitions between a reactor core region wherein the fuel assemblies 3 are loaded and the lower plenum 7 which locates beneath the reactor core.

Four fuel assemblies are loaded per one control rod guide tube 9 via the fuel support piece 12. The fuel support piece 12 is furnished inside with the flow paths 16 which are one per the fuel assembly 3.

The fuel support piece 12 is furnished with the labyrinth 44 as a sealing means at inside of the coolant entrance 16a to the flow path 16. An upper end of the coolant guide tube 28, which is a coolant outlet, is inserted into the inside of the labyrinth 44. The four coolant guide tubes 28, one for each entrance 16a of the coolant, are contained in the control rod guide tube 9.

Figure 24:
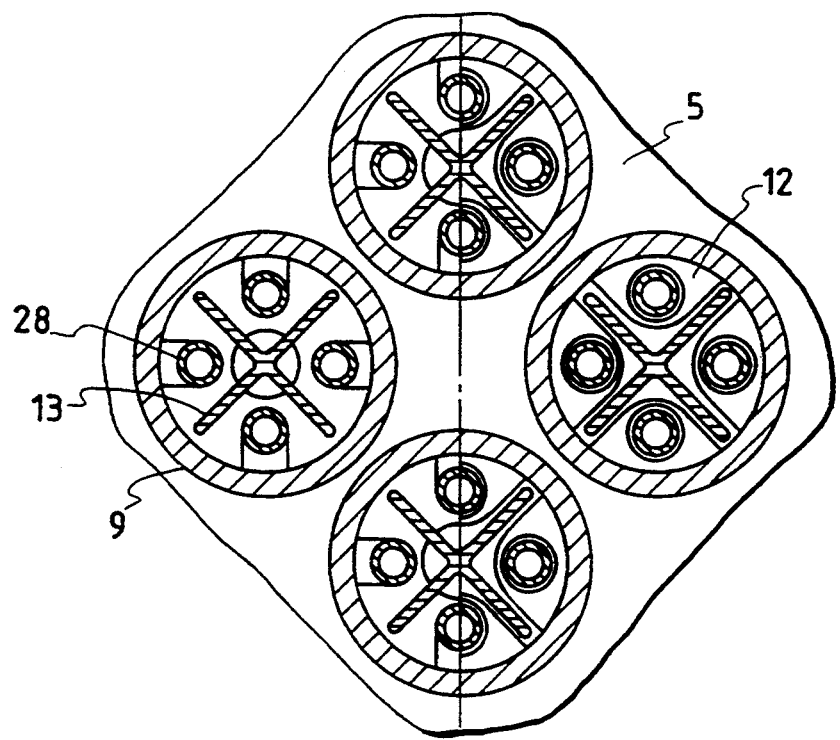
FIG. 24 is a cross section taken on line A—A of FIG. 23.

As shown in FIG. 24, four regions which are surrounded with wing portions of a cruciform cross section of the control rod 13 exist in the control rod guide tube 9. The coolant guide tube 28 is arranged at each of the above four regions.

A middle portion of the coolant guide tube 28 is fixed to inner wall of the control rod guide tube 9 via the bracket 28c.

A lower end portion of the coolant guide tube 28 is bent, and a lower end of the coolant guide tube 28, that is the coolant entrance 28a, is fixed to side wall of a lower end portion of the control rod guide tube 9 so as to open in the lower plenum 7.

The coolant supplied by internal pumps enters into the lower plenum 7, and subsequently, the coolant is supplied into the fuel assembly 3 through the coolant guide tube 28 and the flow path 16.

The coolant accelerates and ascends in the coolant guide tube 28, and has a larger inertia than before entering the coolant guide tube 28. Accordingly, occurrence of two phases flow instability becomes scarce. Furthermore, decreasing rate of the coolant flow at a pump tripping becomes moderate, and a temporary lowering of CPR can be suppressed.

The labyrinth 44 which is furnished between the coolant entrance 16a of the fuel support piece 12 and the coolant outlet 28b of the coolant guide tube 28 prevents the fuel support piece 12 from leaking the coolant into the control rod guide tube 9, and consequently, supply of the coolant from the coolant guide tube to the fuel assembly is ensured.

The control rod guide tube 9 and the coolant guide tube 28 can be handled concurrently by placing the coolant guide tube 28 in the control rod guide tube 9, and consequently, handling of structural members in the lower plenum 7 does not become complex.

Figure 5:
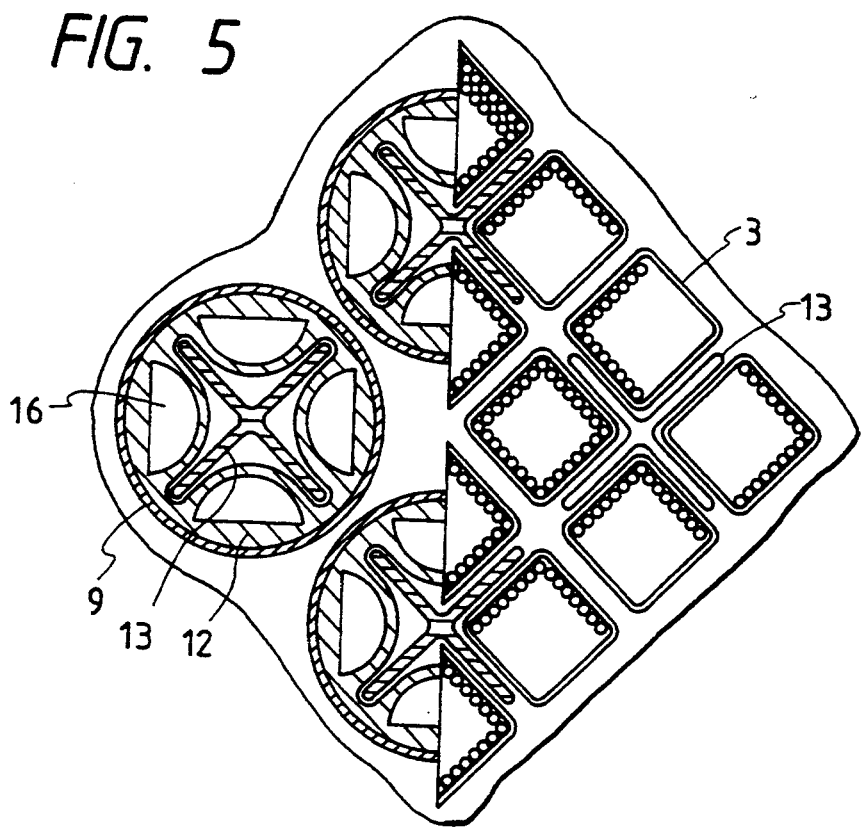
FIG. 5 is a cross section taken on line A—A of FIG. 4.

The present embodiment has an composition wherein the coolant entrance of the fuel support piece is inserted into the control rod guide tube. Accordingly, the present embodiment can be easily applied to the conventional examples shown in FIGS. 4, 5, and 6, which adopt similar compositions as the composition of the present invention.

In each of the embodiments which adopts the coolant guide tube 28, the coolant guide tube having a value of at least 400 for L/A, a length of the coolant guide tube 28 divided by a flow path area, is preferable. Because, when using the coolant guide tube 28 having a value larger than 400 as for the L/A, a decay ratio of the flow vibration can be reduced by more than 10%, and an effect of the coolant guide tube 28 adoption becomes distinguished remarkably.

When an inner diameter of the coolant guide tube 28 is assumed to be 60 millimeters, the length of the coolant guide tube 28 which gives the L/A of 400 is 1.1 meters. And, the length of the coolant guide tube 28 in each of the embodiments which adopts the coolant guide tube 28 actually exceeds 1.1 meters.

In accordance with the invention as claimed in claim 1, boiling water reactors wherein occurrence of two phases flow instability in the fuel assembly is scarce, decreasing rate of the coolant flow at a pump trip is moderate, and the temporary lowering of the CPR is suppressed, can be provided.

In accordance with the invention as claimed in claim 2, an effective structure for placing the control rods adjacent to peripheral four sides of the fuel assembly can be provided in addition to the effects by the invention as claimed in claim 1 because the fuel assembly is supported by the coolant guide tube and the control rod guide tube becomes unnecessary.

In accordance with the invention as claimed in claim 3, the coolant guide tube is not required to support a load of the fuel assembly, and consequently, such an effect is obtained in addition to the effect by the invention as claimed in claim 1 that an arbitrary designing of the coolant guide tube becomes possible without considering the requirement for supporting the load of the fuel assembly.

In accordance with the invention as claimed in claim 4, such an effect is obtained in addition to the effect by the invention as claimed in claim 1 that supporting of the fuel assembly is ensured by supporting the upper portion of the coolant guide tube horizontally by the grid without disturbing vertical movement of the control rod.

In accordance with the invention as claimed in claim 5, such an effect is obtained in addition to the effect by the invention as claimed in claims 2 or 3 that supporting of the fuel assembly is ensured by suppressing horizontal movement of the fuel support piece without disturbing vertical movement of the control rod.

In accordance with the invention as claimed in claim 6, such an effect is obtained in addition to the effect by the invention as claimed in claims 2 or 3 that location of the coolant guide tube is ensured because the grid plate maintains horizontal intervals between the mutual coolant guide tubes.

In accordance with the invention as claimed in claim 7, the effect by the invention as claimed in claim 1 can be applied to a structure for supporting the fuel assembly in the control rod guide tube.

In accordance with the invention as claimed in claim 8, the coolant guide tubes are contained in the control rod guide tube, and consequently, in addition to the effect by the invention as claimed in claim 7, the structure becomes compact as a whole and handling is facilitated.

In accordance with the invention as claimed in claim 9, the coolant can be supplied certainly to each of a plurality of the fuel assemblies which are supported by the control rod guide tubes, furthermore, the effect by the invention as claimed in claim 1 can be applied certainly to each of the fuel assemblies because the coolant guide tube corresponds to each of the fuel assemblies.

In accordance with the invention as claimed in claim 10, the fuel support piece can be omitted from the flow path of the coolant to the fuel assembly, and consequently, in addition to the effect by the invention as claimed in claims 2 or 4, a pressure loss of the coolant in the flow path to the fuel assembly can be reduced, and the structure can be simplified.

In accordance with the invention as claimed in claim 11, measurement of an amount of the coolant for each of the fuel assemblies becomes possible in addition to the effects by the inventions as claimed in any claims from 1 to 10.

In accordance with the invention as claimed in claim 12, the coolant guide tube reduces a decay ratio of the flow vibration of the coolant to the fuel assembly and stabilizes the coolant flow, and accordingly, boiling water reactors wherein two phases flow instability scarcely occurs, decreasing rate of the coolant flow at a pump trip is moderate, and an temporary lowering of the CPR can be suppressed, can be provided.

In accordance with the invention as claimed in claim 13, the fuel support piece is supported across a plurality of adjacent control rod guide tubes, and the coolant flow path from the lower plenum to the fuel assembly can be formed straight in a vertical direction without strongly squeezing a cross section of the control rod guide tube in a cruciform shape, and accordingly, such an effect is obtained that pressure loss of the coolant flow can be reduced with maintaining a mechanical strength of the control rod guide tube for supporting the fuel assembly strong, and the coolant flow instability in the fuel assembly becomes scarce.

In accordance with the invention as claimed in claim 14, a plurality of the control rod guide tubes, although the tubes are arranged close adjacently, can open into the lower plenum by bending side wall of the control rod guide tube in an inward direction of the tube so as to make an opening of the coolant entrance of the fuel support piece downcast, and in addition to the effect by the invention as claimed in claim 13, horizontal locations of the fuel support pieces can be maintained without existence of conventional grid plates wherein the control rod guide tubes are inserted.

In accordance with the invention as claimed in claim 15, such a fuel support piece can be provided that the fuel support piece has a vertical straight flow path with a small pressure loss, and can maintain its horizontal location by its own furnished grid plates.

In accordance with the invention as claimed in claim 16, an effective fuel support piece for utilizing in connecting with the coolant guide tube at the coolant entrance can be provided.

In accordance with the invention as claimed in claim 17, the fuel support piece has a function to maintain exact positions of the surrounding grid plates, and accordingly, the effective fuel support piece for adoption with the dividable grid plates can be provided.

In accordance with the invention as claimed in claim 18, a dividable grid plate which facilitates an operation to take out members locating beneath the grid plate upward can be provided.

In accordance with the invention as claimed in claim 19, the end portion of the control rod wing can be located adjacently to the corner portion of the square grid frame, and accordingly, an effective grid plate for surrounding four sides of the fuel assembly, which locates at an upper portion than the middle portion of the four sides of a square which is formed by connecting the above corner portions, with the wings of the control rods can be provided.

In accordance with the invention as claimed in claim 20, a coolant guide tube, which can supply the coolant having a large inertia into the fuel support piece, can be provided.

In accordance with the invention as claimed in claim 21, a coolant guide tube which contributes to stabilize the coolant flow into the fuel assembly by decreasing a decay ratio of the coolant flow vibration can be provided.

In accordance with the invention as claimed in claim 22, a coolant guide tube having a function to add an inertia to the coolant flow into the fuel support piece can be provided.

What is claimed is;

1. A boiling water reactor wherein a coolant is supplied to fuel assemblies in a reactor pressure vessel from a lower plenum beneath the fuel assemblies;
   characterized in that a guide tube for the coolant to the fuel assembly is extended into said lower plenum in the vicinity of an upper end of a control rod driving mechanism housing of the reactor pressure vessel.

2. A boiling water reactor as claimed in claim 1, wherein said coolant guide tube supports the fuel assembly, said coolant guide tube is supported by a partition plate which divides the lower plenum horizontally in two portions, an upper portion and a lower portion, said partition plate is supported by the reactor pressure vessel, and a coolant entrance of said coolant guide tube opens at a lower region than said partition plate.

3. A boiling water reactor as claimed in claim 1, wherein said fuel assembly is supported by said coolant guide tube and a supporting member which is installed in said lower plenum, said supporting member is supported by a partition plate which divides said lower plenum horizontally in two portions, an upper portion and a lower portion, said partition plate is supported by the reactor pressure vessel, and a coolant entrance of said coolant guide tube opens at a lower region than said partition plate.

4. A boiling water reactor as claimed in claim 2, wherein horizontal intervals among a plurality of fixing portions, to which upper portions of said coolant guide tubes be inserted, are bonded by grid portions which are so arranged as not to interfere with vertical moving regions of control rods.

5. A boiling water reactor as claimed in claims 2 or 3, wherein the fuel assembly is connected through with the coolant guide tube via a fuel support piece, said fuel support piece is furnished with a brim which is widened horizontally as a grid plate, and a portion of outer periphery of said grid plate faces horizontally to other adjacent grid plate and another portion of the outer periphery forms a through space for a control rod.

6. A boiling water reactor as claimed in claims 2 or 3, wherein grid plates which are mutually divided and are furnished with through holes for passing control rods are provided at horizontal intervals among each of adjacent coolant guide tubes, and peripheries of said grid plates which are mutually adjacent are arranged in facing horizontally.

7. A boiling water reactor as claimed in claim 1, wherein the coolant guide tube is installed along substantially a vertical full length of a control rod guide tube which is installed in the lower plenum, and the coolant entrance of the coolant guide tube opens at outer side of said control rod guide tube.

8. A boiling water reactor as claimed in claim 7, wherein the coolant guide tube is arranged in a region of the control rod guide tube where is partitioned by wings of control rods which are guided by said control rod guide tube.

9. A boiling water reactor as claimed in claim 8, wherein the coolant guide tube is installed by connecting a coolant outlet of the coolant guide tube to a coolant entrance of a fuel support piece via a sealing member, a coolant entrance of said coolant guide tube locates and opens at outside of the control rod guide tube, and a same number of plural coolant entrances of said coolant guide tubes and of said fuel support pieces are provided to said control rod guide tube.

10. A boiling water reactor as claimed in any of claims 2 or 4, wherein the coolant guide tube is provided to each of the fuel assemblies, and a coolant entrance of said fuel assembly is directly connected to a coolant outlet of said coolant guide tube.

11. A boiling water reactor as claimed in any of claims from 1-7 and 7-9, wherein the coolant guide tube is provided to each of the fuel assemblies, and said coolant guide tube is furnished with a measuring means for the coolant flow rate.

12. A boiling water reactor wherein a coolant is supplied to fuel assemblies in a reactor pressure vessel from a lower plenum beneath said fuel assemblies,; characterized in that a guide tube having a value at least 400 $(m^{-1})$ of flow path length divided by an area of the flow path for said coolant to said fuel assembly is provided.

13. A boiling water reactor wherein a fuel support piece is provided to a fuel assembly, a coolant entrance of said fuel support piece is provided in downcast, said fuel support piece is supported by a plurality of adjacent control rod guide tubes so that said coolant entrance locates at an upper position than a region among a plurality of said adjacent control rod guide tube, and said region, said coolant entrance, and said fuel assembly are arranged vertically straight on a line.

14. A boiling water reactor as claimed in claim 13, wherein the fuel support piece is furnished with a grid plate which covers a horizontal interval between adjacent control rods and with a hooking portion which connects horizontally said fuel support piece with an adjacent control rod guide tube, said grid plate has such a shape that at least a portion of the grid plate contacts horizontally with adjacent other grid plate, and said control rod guide tube is bent inward of said control rod guide tube in a direction to widen a lower region than said coolant entrance of said fuel support piece.

15. A fuel support piece comprising a coolant outlet which is connected to a coolant entrance of a fuel assembly at an upper portion, and a coolant entrance which opens vertically at exactly beneath said coolant outlet, wherein a grid plate having a horizontally spread area is provided at outer wall of said fuel support piece.

16. A fuel support piece characterized in having a labyrinth at internal periphery of a coolant entrance of said fuel support piece.

17. A fuel support piece characterized in having a brim which is mount on a grid plate and is protruded horizontally from outer wall of said fuel support piece.

18. A grid plate which is a divided grid plate having a polygonal shape, characterized in that said divided grid plate has an opening for a control rod passing through at inner portion of each side of said polygonal shape, and a cutaway for fixing with a grid plate supporting member is provided at a portion of the side of said polygonal shape.

19. A grid plate characterized in comprising a fixing portion, wherein a supporting member for supporting a vertical load of fuel assembly can be fixed, at middle of sides of a square in a square grid frame.

20. A coolant guide tube to a fuel assembly comprising an opening for connecting with a coolant entrance of a fuel support piece at an upper end and a coolant entrance at a lower end, wherein an axial length of the coolant guide tube is substantially equivalent to a length from the coolant entrance of the fuel support piece to the vicinity of an upper end of a control rod driving mechanism housing.

21. A coolant guide tube to a fuel assembly having a value at least 400 $(m^{-1})$ for a flow path length divided by a cross sectional area of the flow path.

22. A control rod guide tube wherein a plurality of coolant guide tubes each of which is connected to a coolant entrance of a fuel support piece are provided avoiding to interfere spaces for vertical movement of control rods, and a coolant entrance of each of said coolant guide tubes opens to outside of the control rod guide tube in the vicinity of a lower end of the control rod guide tube.

23. A boiling water reactor as claimed in claim 5, wherein the coolant guide tube is provided to each of the fuel assemblies, and said coolant guide tube is furnished with a measuring means for the coolant flow rate.

24. A boiling water reactor as claimed in claim 6, wherein the coolant guide tube is provided to each of the fuel assemblies, and said coolant guide tube is furnished with a measuring means for the coolant flow rate.

25. A boiling water reactor as claimed in claim 10, wherein the coolant guide tube is provided to each of the fuel assemblies, and said coolant guide tube is furnished with a measuring means for the coolant flow rate.

* * * * *